(12) United States Patent  
Mizuno

(10) Patent No.: US 11,181,164 B2  
(45) Date of Patent: Nov. 23, 2021

(54) SHOCK ABSORBER

(71) Applicant: TOYOTA JIDOSHA KABUSHIKI KAISHA, Toyota (JP)

(72) Inventor: Kazuyuki Mizuno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 16/857,272

(22) Filed: Apr. 24, 2020

(65) Prior Publication Data

US 2020/0340546 A1  Oct. 29, 2020

(30) Foreign Application Priority Data

Apr. 26, 2019  (JP) .............................. JP2019-086355

(51) Int. Cl.
| | | |
|---|---|---|
| *F16F 9/512* | (2006.01) | |
| *B60G 17/08* | (2006.01) | |
| *F16F 9/34* | (2006.01) | |

(52) U.S. Cl.
CPC ............ *F16F 9/5126* (2013.01); *B60G 17/08* (2013.01); *F16F 9/34* (2013.01)

(58) Field of Classification Search
CPC .............. B60G 17/08; F16F 9/50; F16F 9/512
USPC ......... 188/282.5, 282.6, 315, 322.13, 322.15
See application file for complete search history.

(56) References Cited

U.S. PATENT DOCUMENTS

| | | | | |
|---|---|---|---|---|
| 5,129,488 A | * | 7/1992 | Furuya .................. | B60G 17/08 188/282.6 |
| 5,248,014 A | * | 9/1993 | Ashiba ..................... | F16F 9/50 188/282.5 |
| 5,386,892 A | * | 2/1995 | Ashiba ..................... | F16F 9/512 188/280 |
| 5,497,862 A | | 3/1996 | Hoya | |
| 8,800,732 B2 | * | 8/2014 | Holt ...................... | F16F 9/5126 188/322.13 |
| 2011/0079476 A1 | * | 4/2011 | Holt ....................... | F16F 9/512 188/322.15 |

FOREIGN PATENT DOCUMENTS

| | | |
|---|---|---|
| JP | 7-233840 A | 9/1995 |
| JP | 2013-507589 A | 3/2013 |

OTHER PUBLICATIONS

Manual of Toyota SOARER_E-GZ10, E-MZ10, pp. 3-183 to 3-184, Dec. 24, 2018 (3 pages total).

\* cited by examiner

*Primary Examiner* — Christopher P Schwartz  
(74) *Attorney, Agent, or Firm* — Sughrue Mion, PLLC

(57) ABSTRACT

A shock absorber has a damping force generator including a spool valve body that is reciprocally engaged with a cylindrical portion of a piston and pressed from both sides by a pair of compression coil springs. The cylindrical portion has first openings for extension and compression strokes, and the spool valve body has second openings for extension and compression strokes. When the piston is displaced relative to the cylinder, the spool valve body is displaced by a difference between pressures in upper and lower cylinder chambers, so that the damping force generator changes a degree of overlap of the first and second openings for the extension stroke in the extension stroke and a degree of overlap of the first and second openings for the compression stroke in the compression stroke.

7 Claims, 14 Drawing Sheets

SHOCK ABSORBER

CROSS-REFERENCE TO RELATED APPLICATION

This application claims priority to Japanese Patent Application No. JP2019-86355 filed on Apr. 26, 2019, the content of which is hereby incorporated by reference in its entirety into this application.

BACKGROUND

1. Technical Field

The present disclosure relates to a shock absorber that has a damping force generator including a spool valve.

2. Description of the Related Art

General shock absorbers installed in vehicles such as automobiles include a cylinder, a piston that is reciprocally mated to the cylinder to form two cylinder chambers in cooperation with the cylinder, and a damping force generator installed in the piston within the cylinder. The damping force generator includes damping force generating valves for extension and compression strokes, and when the piston is displaced relative to the cylinder, oil flows between the two cylinder chambers through the damping force generating valves, and damping forces are generated by the resistance of the oil flowing through the damping force generating valves.

In particular, a variable damping force shock absorber configured to change damping forces generated by damping force generators is well known, and a variety of variable damping force structures have been proposed. For example, Japanese Patent Application Laid-open Publication No. H07-233840 discloses a shock absorber in which bypass passages for extension and compression strokes are provided in the piston, and the effective cross-sectional areas of the bypass passages are changed by a rotary valve to change the damping forces at a very low speed range of the piston.

In an extension stroke, the oil in the upper chamber of the cylinder flows to the lower chamber of the cylinder through the bypass passage and the check valve for the extension stroke, and a damping force in the extension stroke is generated by a flow resistance when the oil passes through the bypass passage. In a compression stroke, the oil in the lower chamber of the cylinder flows to the upper chamber of the cylinder through the bypass passage and the check valve for the compression stroke, and a damping force in the compression stroke is generated by a flow resistance when the oil passes through the bypass passage. Furthermore, the damping forces in the extension and compression strokes are changed by the change of the effective cross-sectional areas of the bypass passages for the extension and compression strokes, respectively, by the rotary valve.

For example, as described in the following Japanese translation of PCT international application No. 2013-507589, there has been known a shock absorber in which a damping force generator includes a spool valve and an effective passage cross-sectional area of an orifice is changed by s valve body of the spool valve being driven by a difference between pressures in the upper and lower cylinder chambers. In this type of shock absorber, the higher the piston speed and the higher the differential pressure, the greater the displacement of the spool valve body and the greater the effective passage cross-sectional area of the orifice.

In conventional shock absorbers, a damping force generating valve is a reed valve, and the reed valve is closed by sitting on a valve seat when a difference between pressures in the upper and lower cylinder chambers is small. Therefore, when the shock absorber is activated and the reed valve is seated on the valve seat, a seating noise is inevitably generated. In the shock absorber described in Japanese Patent Application Laid-open Publication No. H07-233840, oil must flow through the bypass passages for the extension and compression strokes, in the extension and compression strokes, respectively. Therefore, check valves must be provided, and since the check valves are reed valves, it is unavoidable that a seating noise is generated. Even if the check valves are ball type check valves, a seating noise is unavoidably generated.

In contrast, the shock absorber described in Japanese translation of PCT international application No. 2013-507589 is configured so that the effective passage cross-sectional area of the orifice is changed by the spool valve body being driven by a difference between pressures in the upper and lower cylinder chambers, so that no seating noise is generated. However, since there is only one spool valve in the piston for extension stroke, a spool valve for compression stroke must be provided in a part other than the piston. Furthermore, spool valves for extension and compression strokes can be considered to be provided in the piston. However, since two spool valves must be provided in the piston, a variable damping force shock absorber cannot be made with the structure described in Japanese translation of PCT international application No. 2013-507589.

SUMMARY

The present disclosure provides a shock absorber of the spool valve type improved so that damping forces in the extension and compression strokes can be generated without generating seating noise by a single damping force generator supported by a piston.

According to the present disclosure, there is provided a shock absorber comprising a cylinder, a piston that is reciprocally engaged with the cylinder along a main axis to form first and second cylinder chambers in cooperation with the cylinder, and a damping force generator supported by the piston within the cylinder, the first and second cylinder chambers containing a working fluid.

The damping force generator includes a spool valve body that is reciprocally engaged with a cylindrical portion provided in the piston along a relative motion axis, and a pair of elastic elements that press the spool valve body in a direction approaching each other from both sides along the relative motion axis.

The cylindrical portion has an outer diameter larger than the other portions of the piston and has a sliding portion that is in contact with the cylinder, and a first opening for a extension stroke and a first opening for a compression stroke provided on the side of the second and first cylinder chambers, respectively, with respect to the sliding portion.

The spool valve body has a second opening for the extension stroke and a second opening for the compression stroke, and the spool valve body cooperates with the cylindrical portion to form a first inner chamber that is always in communication with the second cylinder chamber and a second inner chamber that is always in communication with the first cylinder chamber.

The damping force generator is configured so that in the extension stroke, the first and second cylinder chambers are connected through the first and second openings for the extension stroke that at least partially overlap each other and the first inner chamber, and a damping force in the extension stroke is generated by a flow resistance when the working fluid passes through the first and second openings for the extension stroke, and in the compression stroke, the first and second cylinder chambers are connected through the first and second openings for the compression stroke that at least partially overlap each other and the second inner chamber, and a damping force in the compression stroke is generated by a flow resistance when the working fluid passes through the first and second openings for the compression stroke.

The damping force generator is configured to change an overlap area of the first and second openings for the extension stroke and an overlap area of the first and second openings for the compression stroke by displacing the spool valve body relative to the cylindrical portion along the relative motion axis by a difference between pressures in the first and second cylinder chambers when the piston is displaced relative to the cylinder along the main axis.

According to the above configuration, the damping force generator includes a spool valve body that is reciprocally engaged with a cylindrical portion provided in the piston along a relative motion axis, and a pair of elastic elements that press the spool valve body in a direction approaching each other from both sides along the relative motion axis. Therefore, there is only one spool valve body.

In the extension stroke, the spool valve body is displaced relative to the cylindrical portion in the direction of approaching the second cylinder chamber due to a difference between pressures in the first and second cylinder chambers, and the first and second openings for the extension stroke overlap each other. Therefore, the working fluid flows from the first cylinder chamber through the first and second openings for the extension stroke and the first inner chamber to the second cylinder chamber, and a damping force in the extension stroke is generated by a flow resistance when the working fluid passes through the first and second openings for the extension stroke.

In the compression stroke, the spool valve body is displaced relative to the cylindrical portion in the direction of approaching the first cylinder chamber due to the difference between pressures in the first and second cylinder chambers, and the first and second openings for the compression stroke overlap each other. Therefore, the working fluid flows from the second cylinder chamber through the first and second openings for the compression stroke and the second inner chamber to the first cylinder chamber, and a damping force in the compression stroke is generated by a flow resistance when the working fluid passes through the first and second openings for the compression stroke.

When the piston is not displaced relative to the cylinder and there is no difference between the pressures in the first and second cylinder chambers, the pressing forces on the spool valve body are the same and the spool valve body is in a standard reciprocating position with respect to the cylindrical portion. Therefore, the spool valve body is not seated at the seat portion when moving from a position other than the standard reciprocating position to the standard reciprocating position. Therefore, a single damping force generator supported by the piston can generate the damping forces in the extension and compression strokes without generating a seating noise.

In one aspect of the present disclosure, an overlap area of the first and second openings for the extension stroke and an overlap area of the first and second openings for the compression stroke are minimized when a pressing forces of the pair of elastic elements acting on the spool valve body are the same and the spool valve body is in the standard reciprocating position with respect to the cylindrical portion.

According to the above aspect, when the pressing forces acting on the spool valve body are the same and the spool valve body is in the standard reciprocating position with respect to the cylindrical portion, the overlap area of the two openings for the extension stroke and the overlap area of the two openings for the compression stroke are minimized. Thus, as the spool valve body is moved away from the standard reciprocating position, the overlap area of the two openings for the extension stroke and the overlap area of the two openings for the compression stroke can be progressively increased.

In another aspect of the present disclosure, the shock absorber further includes an actuator that rotates the spool valve body about the relative motion axis, and the damping force generator is configured to change the overlap area of the first and second openings for the extension stroke and the overlap area of the first and second openings for the compression stroke by rotating the spool valve body relative to the cylindrical portion.

According to the above aspect, as the spool valve body is rotated relative to the cylindrical portion by the actuator, the overlap area of the first and second openings for the extension stroke and the overlap area of the first and second openings for the compression stroke is changed. Therefore, by rotating the spool valve body by the actuator, the damping force characteristics of the extension and compression strokes can be changed because a flow resistance when the working fluid passes through the overlapping openings can be changed.

Further, in another aspect of the present disclosure, the actuator is coupled to the spool valve body by a coupling device, and the coupling device is configured to allow the spool valve body to be displaced with respect to the actuator along the relative motion axis, but to prevent the spool valve body from rotating relative to the actuator around the relative motion axis.

If the actuator is integrally coupled to the spool valve body by a coupling device, the actuator must also be moved along the relative motion axis synchronously with the spool valve body when the latter is displaced along the relative motion axis. As a result, a support structure of the actuator becomes complicated, and in some cases, a means to drive the actuator is required.

In contrast, according to the above aspect, the actuator is coupled to the spool valve body by a coupling device so that the spool valve body is prevented from rotating with respect to the actuator around the relative motion axis and the spool valve body can be displaced with respect to the actuator along the relative motion axis. Therefore, it is not necessary to move the actuator along the relative motion axis synchronously with the spool valve body when the spool valve body is displaced along the relative motion axis, thus simplifying the support structure of the actuator and eliminating the need for a means to drive the actuator.

Further, in another aspect of the present disclosure, thrust bearings are disposed between the spool valve body and the pair of elastic elements.

According to the above aspect, since thrust bearings intervene between the spool valve body and the elastic elements, the spool valve body can rotate around the relative motion axis with virtually no resistance in the direction of rotation by the elastic elements. Therefore, the actuator can smoothly rotate the spool valve body around the relative motion axis, as compared to where no thrust bearing intervenes between the spool valve body and the elastic elements.

Further, in another aspect of the present disclosure, the spool valve body is rotated relative to the cylindrical portion by the actuator, and the positional relationship around the relative motion axis of the first and second openings for the extension stroke and the positional relationship around the relative motion axis of the first and second openings for the compression stroke are changed, so that modes of the damping force can be changed to at least two modes including a first mode in which the damping force in the extension stroke is hard and the damping force in the compression stroke is soft, a second mode in which the damping force in the extension stroke and the damping force in the compression stroke are soft, and a third mode in which the damping force in the extension stroke is soft and the damping force in the compression stroke is hard.

According to the above aspect, by rotating the spool valve body relative to the cylindrical portion by the actuator, the modes of the damping force can be changed to at least two modes out of the three modes. Therefore, the required modes in the control of damping forces, for example, the control of damping forces based on the skyhook theory, can be easily achieved. Moreover, since there is no need to provide first and second openings for the extension stroke and first and second openings for the compression stroke for each mode, the structure of the damping force generator can be simplified as compared to where openings are provided for each mode.

Further, in another aspect of the present disclosure, the cylindrical portions has a pair of first openings for the extension stroke and a pair of first openings for the compression stroke, the openings of each pair being spaced apart in a radial direction with respect to the relative motion axis, and the spool valve body has a pair of second openings for the extension stroke and a pair of second openings for the compression stroke, the openings of each pair being spaced apart in a radial direction with respect to the relative motion axis.

According to the above aspect, the cylindrical portion is provided with a pair of first openings for the extension stroke and a pair of first openings for the compression stroke, which are spaced apart in the radial direction, and the spool valve body is provided with a pair of second openings for the extension stroke and a pair of second openings for the compression stroke, which are spaced apart in the radial direction. Therefore, as compared to where each opening is provided only one each, there are more channels for the working fluid to flow, so that the working fluid can flow smoothly. In particular, the angle of rotation of the spool valve body around the relative motion axis required when the mode of damping force is changed to at least two modes out of the three modes can be reduced as compared to where each opening is provided only one each. Therefore, it is possible to change the damping force modes in a responsive manner.

As used herein, the term "hard" refers to a damping force higher than a predetermined standard damping force, and "soft" refers to a damping force lower than the standard damping force.

Other objects, other features and attendant advantages of the present disclosure will be readily understood from the description of the embodiments of the present disclosure described with reference to the following drawings.

BRIEF DESCRIPTION OF THE DRAWINGS

FIG. 8 shows a cross-sectional view of the spool valve body along the lines VIII-VIII shown in FIG. 4.

DETAILED DESCRIPTION

The present disclosure will now be described in detail with reference to the accompanying drawings.

Figure 1:
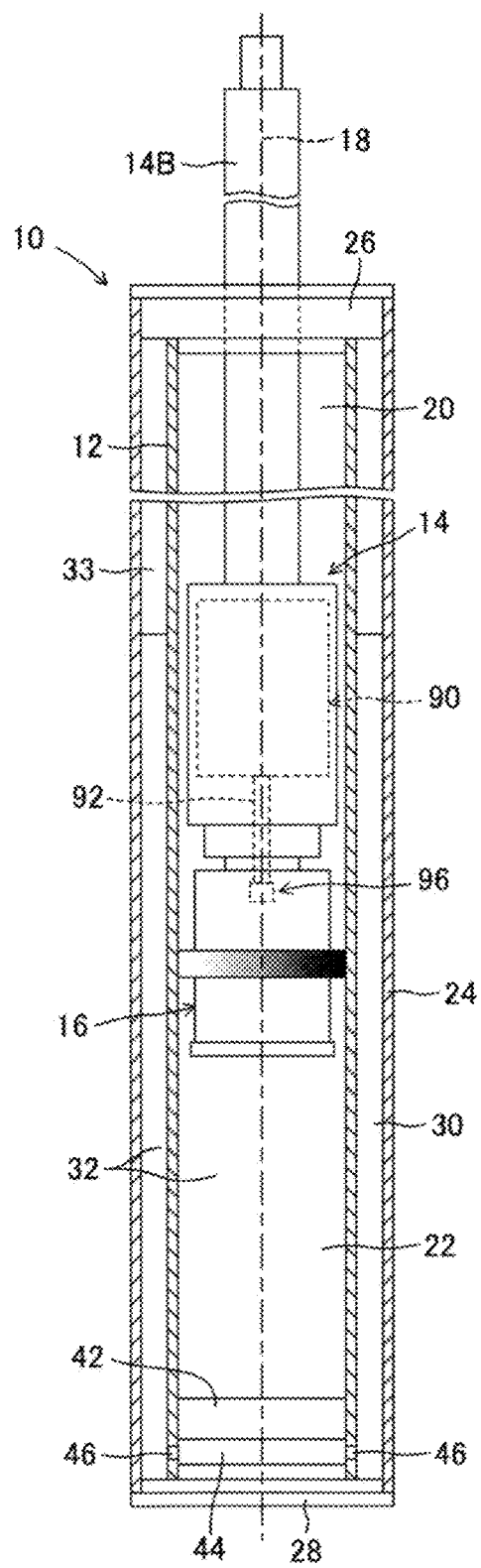
FIG. 1 is a schematic longitudinal sectional view showing an embodiment of a shock absorber configured as a twin-tube type shock absorber.

In FIG. 1, the shock absorber 10 of the embodiment includes a cylinder 12, a piston 14, and a damping force generator 16 supported by the piston within the cylinder. The piston 14 is reciprocally engaged with the cylinder 12 along a main axis 18 to form an upper cylinder chamber 20 as a first cylinder chamber and a lower cylinder chamber 22 as a second cylinder chamber in cooperation with the cylinder.

The shock absorber 10 is a twin-tube shock absorber, including an outer shell 24 that extends concentrically with the cylinder 12 along the main axis 18. Upper caps 26 and lower caps 28 are fixed at the upper and lower ends, respectively, of the cylinder 12 and outer shell 24. The upper cap 26 and the lower cap 28 work together with the cylinder 12 and the outer shell 24 to form an annular chamber 30.

The upper cylinder chamber 20, the lower cylinder chamber 22, and the annular chamber 30 are filled with oil 32 serving as a working fluid, and the upper part of the annular chamber 30 is filled with an inert gas 33 such as nitrogen gas. Although not shown in the figures, a rebound stopper is attached to the upper surface of the large diameter portion of the piston 14 or to the lower surface of the upper cap 26 to prevent the relative displacement of the piston 14 in the extension direction relative to the cylinder 12 from exceeding a reference value.

Figure 2:
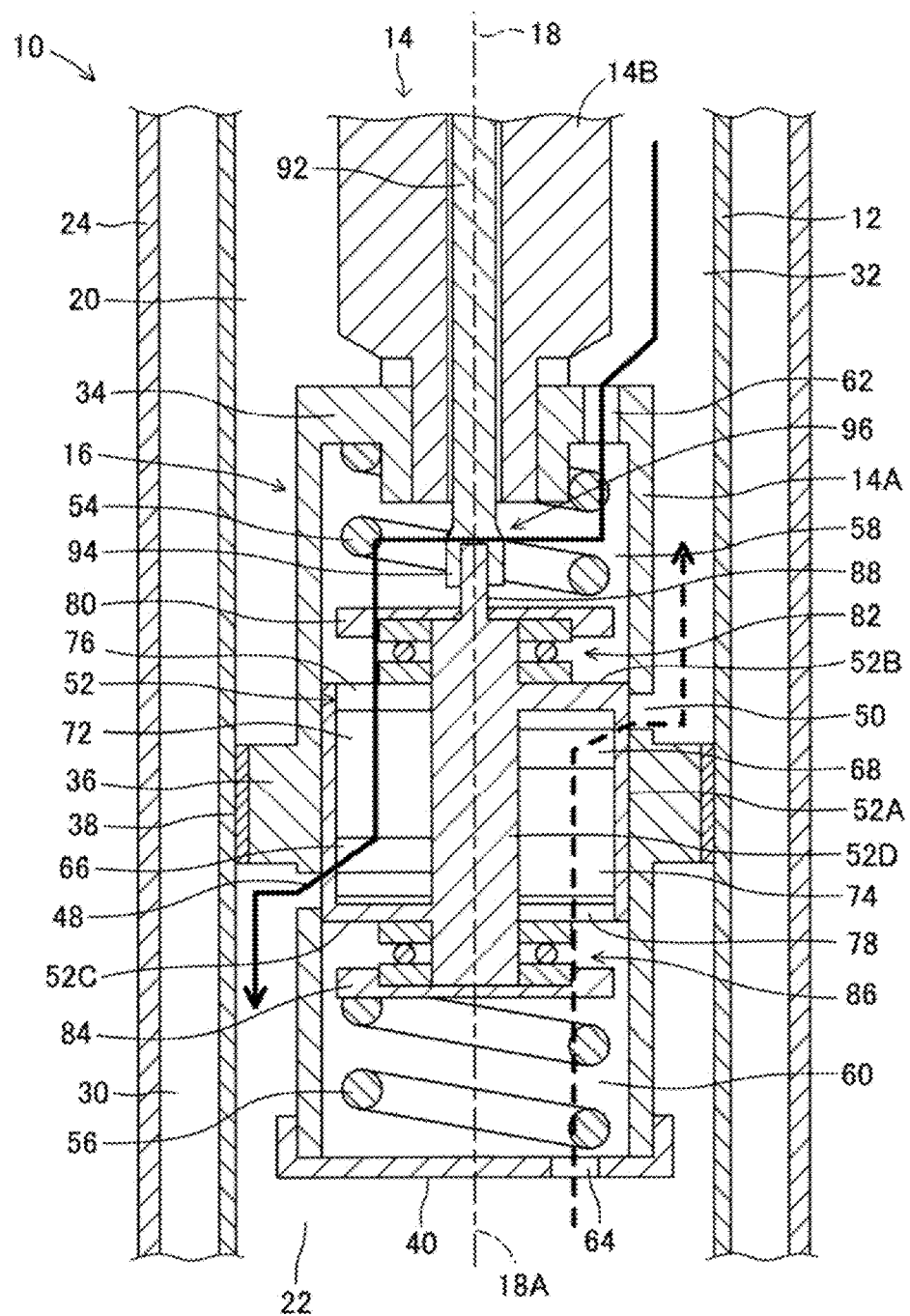
FIG. 2 is an enlarged cross-sectional view of the damping force generator shown in FIG. 1.
Figure 3:
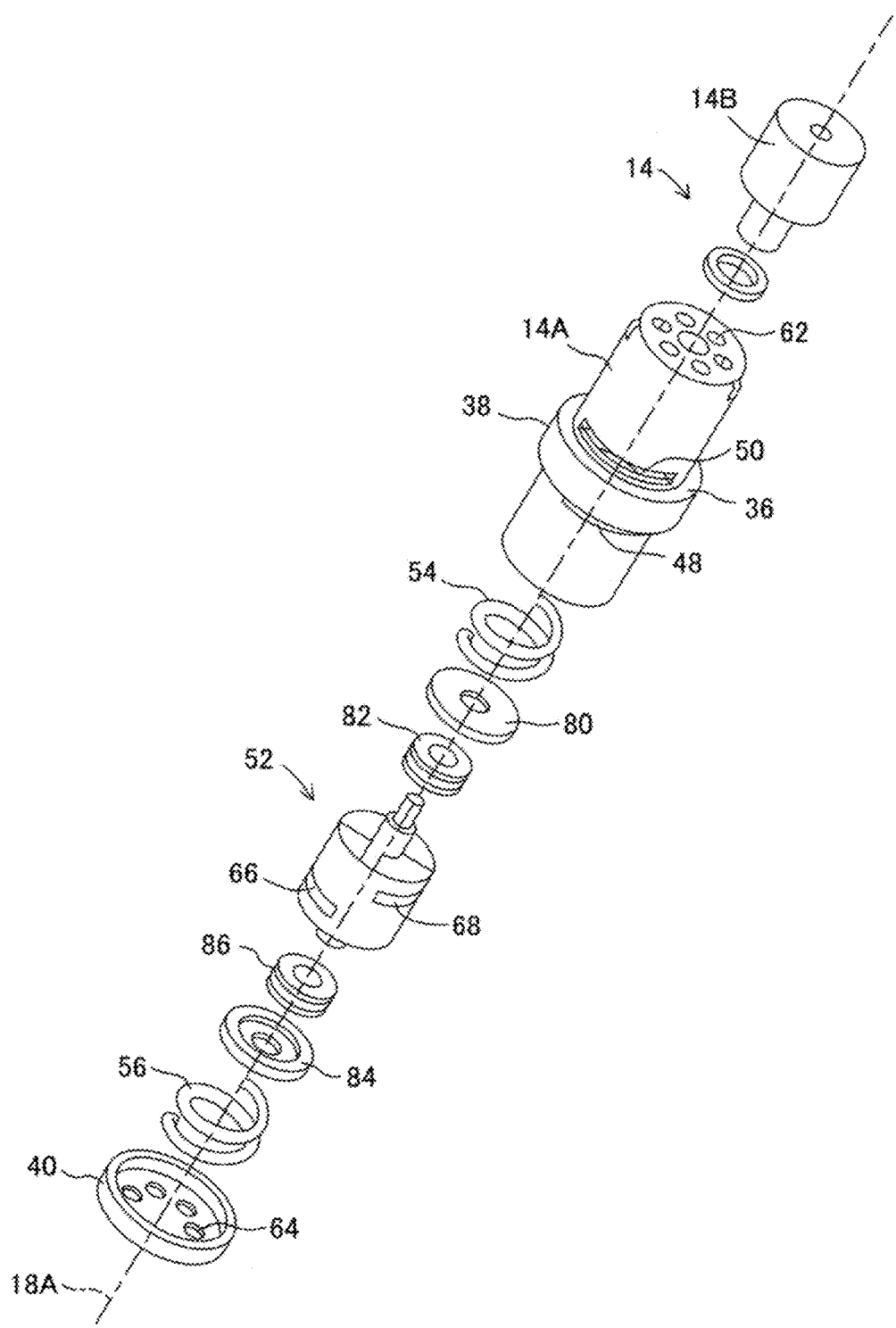
FIG. 3 is an exploded perspective view of the damping force generator shown in FIG. 1.
Figure 4:
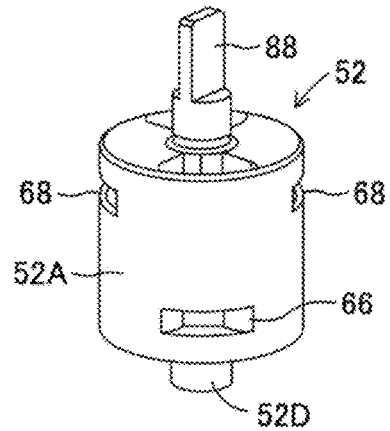
FIG. 4 shows a perspective view of the spool valve body shown in FIG. 3.
Figure 5:
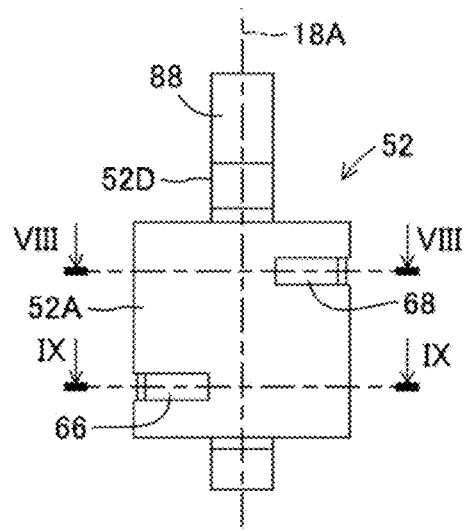
FIG. 5 is a front view showing the spool valve body.
Figure 6:
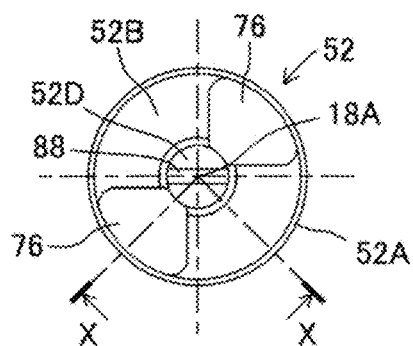
Figure 7:
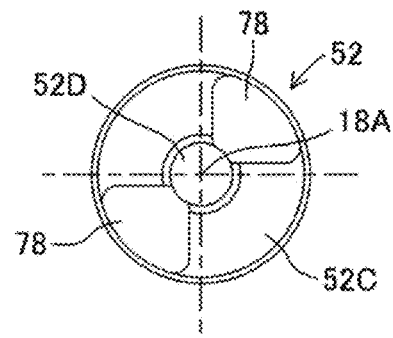
FIG. 7 is a bottom view showing the spool valve body.

As shown in FIG. 2, the piston 14 has a cylindrical main body (cylindrical portion) 14A that is engaged with the cylinder 12 and opens downward, and a rod portion 14B that extends along the main axis 18, and the lower end of the rod portion 14B is integrally coupled with an upper end wall 34 of the main body 14A by screwing. The main body 14A has a sliding portion 36 in the center of the longitudinal direction for contact with the cylinder 12, and the sliding portion 36 has an outer diameter that is larger than other portions of the main body 14A. A friction-reducing band 38 made of elastic and abrasion-resistant materials such as rubber or resin is fixed to the sliding portion 36.

The sliding portion 36 of the main body 14A divides the inside of the cylinder 12 into the upper cylinder chamber 20 and the lower cylinder chamber 22. The lower part of the rod portion 14B is placed in the upper cylinder chamber 20, and the rod portion extends upward of the upper cap 26 through the upper cap. The upper cap 26 functions as a rod guide that supports the rod portion 14B reciprocally along the main axis 18, and includes an oil seal (not shown) that seals the space between the upper cap and the rod portion 14B. When the shock absorber 10 is applied to a vehicle such as an automobile, the upper end of the rod portion 14B is connected to a sprung member and the outer shell 24 is connected to an unsprung member.

As shown in FIG. 1, a dividing wall 42 is fixed near the lower end of the cylinder 12 separated from the lower cap 28. The dividing wall 42 cooperates with the cylinder 12 and the lower cap 28 to form a connecting chamber 44. The connecting chamber 44 is connected to the annular chamber 30 by a plurality of connecting holes 46 provided in the cylinder 12. Although not shown in FIG. 1, the dividing wall 42 may be provided with a damping force generating valves (base valves) for the extension and compression strokes. These damping force generating valves may have any structure known in the art.

As shown in FIG. 2, a valve cap 40 is screwed onto the lower end of the main body 14A, and the main body 14A and the valve cap 40 function as a housing for the damping force generator 16. In the position proximate to the sliding portion 36 of the main body 14A, there are a pair of first openings 48 for the extension stroke and a pair of first openings 50 for the compression stroke provided on the side of the lower cylinder chamber 22 and the upper cylinder chamber 20, respectively, with respect to the sliding portion.

Figure 11:
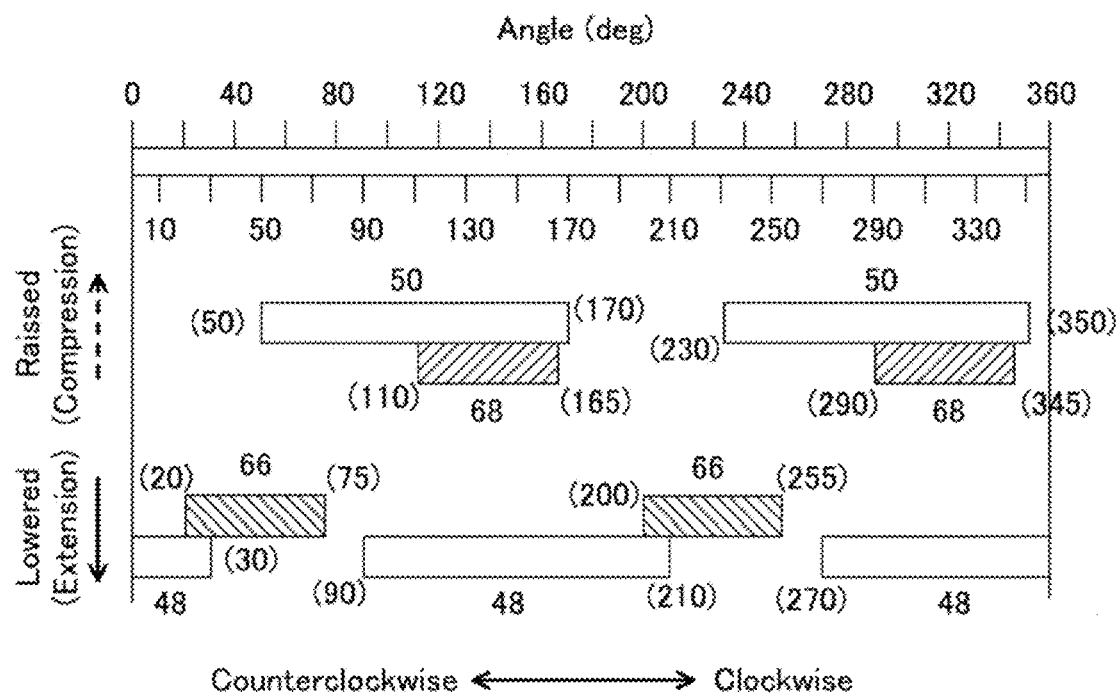
FIG. 11 is a diagram showing the positional relationship between the first and second openings for the extension stroke and the first and second openings for the compression stroke when the spool valve body is in the standard reciprocating and rotating positions for the first mode where the damping force characteristic of the extension stroke is hard and the damping force characteristic of the compression stroke is soft.
Figure 13:
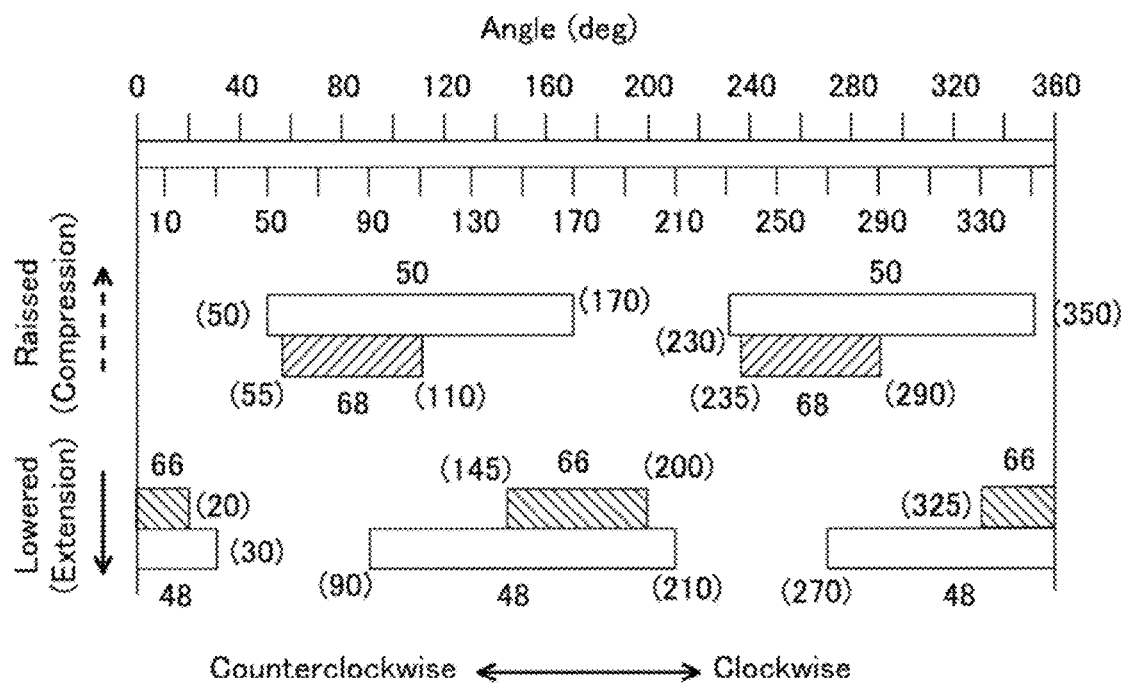
FIG. 13 is a diagram showing the positional relationship between the first and second openings for the extension stroke and the first and second openings for the compression stroke when the spool valve body is in the standard reciprocating and rotating positions in the second mode where the damping force characteristics of the extension and compression strokes are soft.
Figure 15:
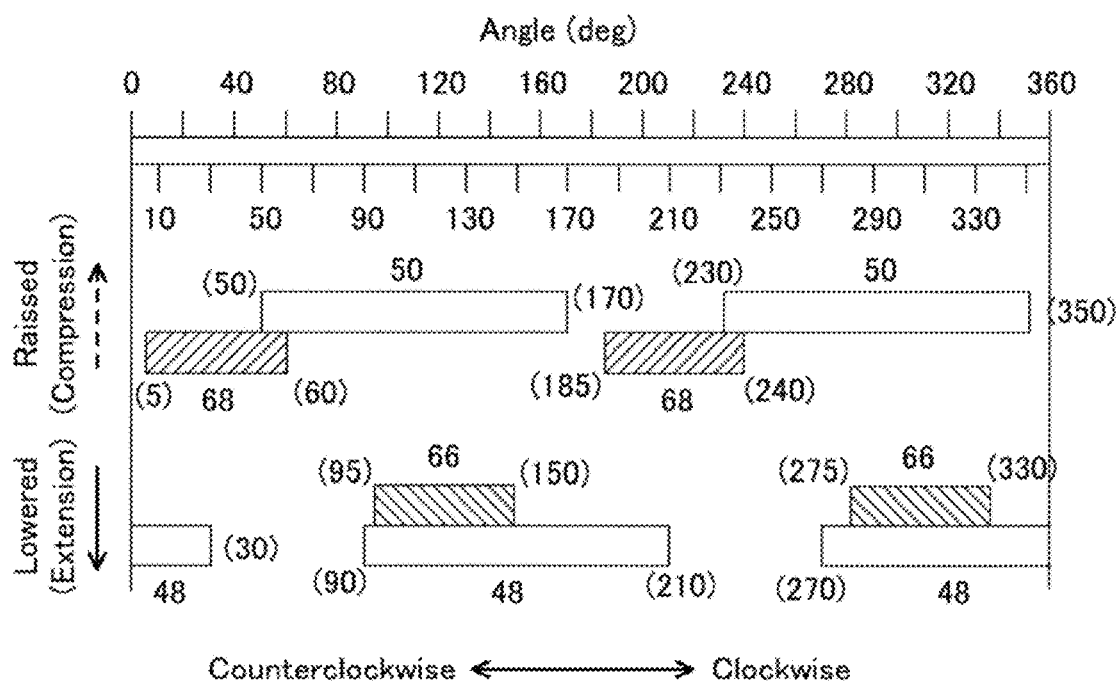
FIG. 15 is a diagram showing the positional relationship between the first and second openings for the extension stroke and the first and second openings for the compression stroke when the spool valve body is in the standard reciprocating and rotating positions for the third mode where the damping force characteristic of the extension stroke is soft and the damping force characteristic of the compression stroke is hard.

The openings 48 and 50 are always connected to the lower cylinder chamber 22 and the upper cylinder chamber 20, respectively, and extend circumferentially over an angle range of 120° around a relative motion axis 18A, as shown in FIGS. 11, 13 and 15. The centers of the pair of first openings 48 for the extension stroke and the center of the pair of first openings 50 for the compression stroke are spaced apart in the radial direction with respect to the relative motion axis 18A, respectively. Furthermore, the centers of the pair of openings 48 and the centers of the pair of openings 50 are spaced apart from each other by 40° around the relative motion axis 18A.

A spool valve body 52 and a pair of compression coil springs 54 and 56 serving as a pair of elastic elements are arranged in the main body 14A. The spool valve body 52 can be reciprocated along the relative motion axis 18A and is mated with the main body 14A rotatably around the relative motion axis 18A. In the illustrated embodiment, the relative motion axis 18A is aligned with the main axis 18, but the relative motion axis 18A may not be aligned with the main axis 18. The compression coil springs 54 and 56 press the spool valve body 52 along the relative motion axis 18A in a direction approaching each other from both the upper and lower sides. When the shock absorber 10 is not extending or compressing, that is, when the piston 14 is not displaced relative to the cylinder 12, the spool valve body 52 is stationary in a position where the spring forces of the compression coil springs 54 and 56 are the same (the position is referred to as "standard reciprocating position").

The spool valve body 52 cooperates with the main body 14A to form a variable volume upper inner chamber 58, and cooperates with the main body 14A and the valve cap 40 to form a variable volume inner lower chamber 60. The end wall 34 and the valve cap 40 of the main body 14A have a plurality of connecting holes 62 and 64, respectively. The upper inner chamber 58 and the lower inner chamber 60 are always connected to the upper cylinder chamber 20 and the lower cylinder chamber 22 through the connecting holes 62 and 64, respectively.

The spool valve body 52 has a cylindrical portion 52A extending along the relative motion axis 18A, an end wall 52B and 52C that are integrally connected with the upper and lower ends of the cylindrical portion 52A and extend perpendicular to the relative motion axis 18A, and an axial portion 52D that connects these end walls together and extends along the relative motion axis 18A. The outer circumference of the cylindrical portion 52A is in contact with the inner circumference of the main body 14A. A pair of second openings 66 for the expansion stroke and a pair of second openings 68 for the compression stroke are provided in the cylindrical portion 52A adjacent to the lower end wall 52C and the upper end wall 52B, respectively.

As shown in FIGS. 11, 13 and 15, the openings 66 and 68 extend circumferentially in an angle range of 55° around the relative motion axis 18A, except for the fourth mode, which will be described below. The centers of the pair of the second openings 66 for the extension stroke and the centers of the pair of the second openings 68 for the compression stroke are spaced apart in the radial direction with respect to the relative motion axis 18A, respectively. Furthermore, the pair of the second openings 66 for the extension stroke and the pair of the second openings 68 for the compression stroke are alternately provided around the relative motion axis 18A, and the centers of these openings are spaced apart by 90° from each other around the relative motion axis 18A.

Figure 8:
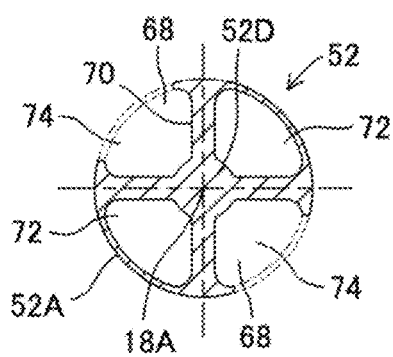
FIG. 8 is a plan view showing the spool valve body.
Figure 9:
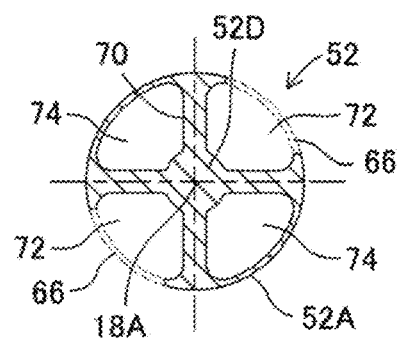
FIG. 9 shows a cross-sectional view of the spool valve body along the lines IX-IX shown in FIG. 4.
Figure 10:
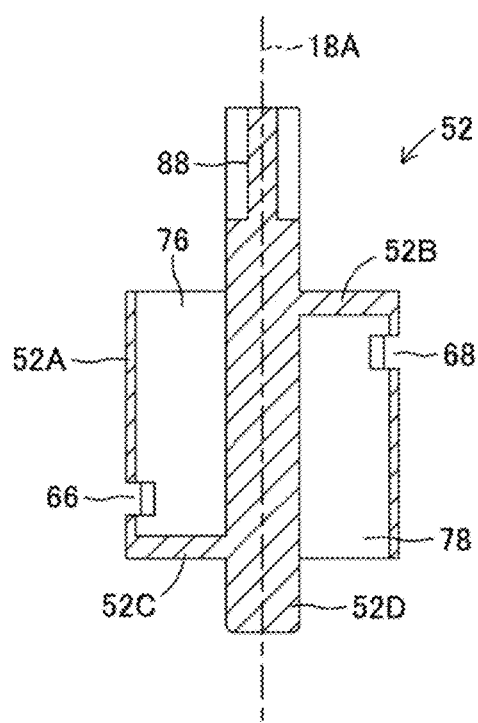
FIG. 10 is a longitudinal cross-sectional view showing the spool valve body cut at the cutting surface through the relative motion axis.

Furthermore, as shown in FIGS. 8 and 9, the spool valve body 52 has four partition walls 70 that extend along the radial direction and relative motion axis 18A and connect the cylindrical portion 52A to the axial portion 52D. These partition walls 70 are evenly spaced around the relative motion axis 18A and form a pair of internal passages 72 for the extension stroke and a pair of internal passages 74 for the compression stroke spaced apart in the radial direction in cooperation with the cylindrical portion 52A. The internal passages 72 for the extension stroke and the internal passages 74 for the compression stroke extend linearly along the relative motion axis 18A. Each internal passage 72 is always connected to the upper inner chamber 58 through a substantially fan-shaped opening 76 provided in the upper end wall 52B, and each internal passage 74 is always connected to the lower inner chamber 60 through a substantially fan-shaped opening 78 provided in the lower end wall 52C.

As can be seen from the above explanation, the two internal passages 72 and the upper inner chamber 58 form a first inner chamber that is always connected to the upper cylinder chamber 20 through the openings 76 and the connecting holes 62. When the spool valve body 52 is in the standard reciprocating position, the first openings 48 for the extension stroke and the second openings 66 for the extension stroke do not overlap each other, and the internal passages 72 do not communicate with the lower cylinder chamber 22. However, when the spool valve body 52 is displaced downward with respect to the main body 14A along the relative motion axis 18A, the first openings 48 for the extension stroke and the second openings 66 for the extension stroke at least partially overlap each other, and the internal passages 72 communicate with the lower cylinder chamber 22 through these openings.

Similarly, the two internal passages 74 and the lower inner chamber 60 form a second inner chamber that is always connected to the lower cylinder chamber 22 through the openings 78 and the connecting holes 64. When the spool valve body 52 is in the standard reciprocating position, the first openings 50 for the compression stroke and the second openings 68 for the compression stroke do not overlap each other, and the internal passages 74 do not communicate with the upper cylinder chamber 20. However, when the spool valve body 52 is displaced upward with respect to the main body 14A along the relative motion axis 18A, the first openings 50 for the extension stroke and the second openings 68 for the extension stroke at least partially overlap each other, and the internal passages 74 communicate with the upper cylinder chamber 20 through these openings.

As will be explained in detail below, the overlap area between the first and second openings 48 and 66 for the extension stroke is minimum (0) when the spool valve body 52 is in the standard reciprocating position, and increases as the amount of downward displacement of the spool valve body 52 with respect to the main body 14A increases. Similarly, the overlap area between the first and second openings 50 and 68 for the compression stroke is minimum (0) when the spool valve body 52 is in the standard reciprocating position and increases as the amount of upward displacement of the spool valve body 52 with respect to the main body 14A increases. Furthermore, as the spool valve body 52 rotates with respect to the main body 14A around the relative motion axis 18A, the overlap area of the first and second openings 48 and 66 for the extension stroke and the overlap area of the first and second openings 50 and 68 for the compression stroke change.

In the illustrated embodiment, the upper compression coil spring 54 is resiliently disposed between the end wall 34 and a spring seat member 80 having a disc shape, and a thrust bearing 82 is provided between the spring seat member 80 and the upper end wall 52B of the spool valve body 52. Similarly, the lower compression coil spring 56 is resiliently disposed between the valve cap 40 and a spring seat member 84, and a thrust bearing 86 is provided between the spring seat member 84 and the lower end wall 52C of the spool valve body 52. It should be noted that the thrust bearings 82 and 86 are not limited to bearing devices including rolling elements such as balls and rollers, but may be friction-reducing washers and the like.

A flat plate type connecting portion 88 extending along the relative motion axis 18A is provided at the upper end of the axial portion 52D of the spool valve body 52. A yoke type connecting portion 94 of an output shaft 92 of a rotary actuator 90 is disposed on both sides of the connecting portion 88. The connecting connections 88 and 94 are engaged with each other in two planes such that they are capable of relatively displacing along the relative motion axis 18A and are not capable of relatively rotating around the relative motion axis 18A. Accordingly, the connecting portions 88 and 94 function as a coupling device 96 that couples the axial portion 52D of the spool valve body 52 to the output shaft 92 of the actuator 90. The coupling device 96 is configured to allow the spool valve body 52 to be displaced with respect to the actuator 90 along the relative motion axis 18A, but to prevent the spool valve body 52 from rotating relative to the actuator around the relative motion axis 18A.

The actuator 90 includes an electric rotary drive device such as a stepping motor and rotates the output shaft 92 in response to an input control signal to rotate and position the spool valve body 52 around the relative motion axis 18A with respect to the main body 14A. Accordingly, the damping force generator 16 is configured so that the overlap area of the first and second openings 48 and 66 for the extension stroke and the overlap area of the first and second openings 50 and 68 for the compression stroke change as the spool valve body 52 is rotated around the relative motion axis 18A by the actuator 90. As will be described later, when the rotation angle of the output shaft 92 is 0, the spool valve body 52 is positioned in a standard rotation position relative to the main body 14A.

The smaller the overlap area between the first and second openings 48 and 66 for the extension stroke, the higher the squeezing effect on the oil 32 passing through these openings, so that the openings 48 and 66 work together with each other to function as orifices for the extension stroke. Similarly, the smaller the overlap area between the first and second openings 50 and 68 for the compression stroke, the higher the squeezing effect on the oil 32 passing through these openings, so that the openings 50 and 68 work together to function as orifices for the compression stroke.

<Operation of the Embodiment>
<Extension Stroke>

In the extension stroke of the shock absorber 10, the piston 14 is displaced upward relative to the cylinder 12 as seen in FIG. 1, and the pressure in the upper cylinder chamber 20 increases and the pressure in the lower cylinder chamber 22 decreases. Accordingly, the spool valve body 52 displaces downwardly with respect to the main body 14A, so that the first and second openings 48 and 66 for the extension stroke at least partially overlap each other. As a result, as shown by the solid arrow in FIG. 2, the oil 32 in the upper cylinder chamber 20 flows to the lower cylinder chamber 22 and the oil 32 in the annular chamber 30 flows to the lower cylinder chamber 22. Therefore, a damping force in the extension stroke is generated by a flow resistance when the oil 32 passes through the first and second openings 48 and 66 for the extension stroke of the damping force generator 16. A damping force is also generated by the damping force generating valve for the extension stroke provided in the dividing wall 42, but the damping force in the extension stroke of the shock absorber 10 as a whole is determined by the damping force generated by the damping force generator 16.

In particular, when the shock absorber 10 is in the extension stroke and the piston 14 is in the stroke of rising, the higher the speed of the piston 14, the greater the differential pressure between the pressure in the upper cylinder chamber 20 and the pressure in the lower cylinder chamber 22. Therefore, the higher the speed of the piston 14, the greater the amount of downward displacement of the spool valve body 52 with respect to the main body 14A, and the larger the overlap area of the first and second openings 48 and 66 for the extension stroke. It should be noted that in the latter half of the extension stroke of the shock absorber 10, when the rising speed of the piston 14 decreases, the differential pressure between the pressure in the upper cylinder chamber 20 and the pressure in the lower cylinder chamber 22 decreases, so that the amount of downward displacement of the spool valve body 52 with respect to the main body 14A decreases, and the overlap area of the first and second openings 48 and 66 for the extension stroke also decreases.

<Compression Stroke>

In the compression stroke of the shock absorber 10, the piston 14 is displaced downward relative to the cylinder 12 as seen in FIG. 1, and the pressure in the upper cylinder chamber 20 decreases and the pressure in the lower cylinder chamber 22 increases. Accordingly, the spool valve body 52 is displaced upward with respect to the main body 14A, so that the first and second openings 50 and 68 for the compression stroke at least partially overlap each other. As a result, as shown by the dashed arrow in FIG. 2, the oil 32 in the lower cylinder chamber 22 flows into the upper cylinder chamber 20 and the oil 32 in the lower cylinder chamber 22 flows into the annular chamber 30. Therefore, a damping force in the compression stroke is generated by a flow resistance when the oil 32 passes through the first and second openings 50 and 68 for the compression stroke of the damping force generator 16. A damping force is also generated by the damping force generating valve for the compression stroke provided in the dividing wall 42, but the damping force in the compression stroke of the shock absorber 10 as a whole is determined by the damping force generated by the damping force generator 16.

In particular, when the shock absorber 10 is in the compression stroke and the piston 14 is in the stroke of descending, the higher the speed of the piston 14, the greater the differential pressure between the pressure in the upper cylinder chamber 20 and the pressure in the lower cylinder chamber 22. Therefore, the higher the speed of the piston 14, the greater the amount of upward displacement of the spool valve body 52 with respect to the main body 14A, and the larger the overlap area of the first and second openings 50 and 68 for the compression stroke. It should be noted that when the piston 14 descends at a lower speed in the latter half of the compression stroke of the shock absorber 10, the differential pressure between the pressure in the upper cylinder chamber 20 and the pressure in the lower cylinder chamber 22 decreases, so that the amount of upward displacement of the spool valve body 52 with respect to the main body 14A decreases and the overlap area of the first and second openings 50 and 68 for the compression stroke also decreases.

As described above, the damping forces in the extension and compression strokes of the shock absorber 10 increase with the speed of the piston 14, as in a conventional shock absorber. Also, as mentioned above, the overlap area of the first and second openings 48 and 66 for the extension stroke and the overlap area of the first and second openings 50 and 68 for the compression stroke change as the spool valve body 52 of the damping force generator 16 is rotated around the relative motion axis 18A by the actuator 90. Therefore, as the spool valve body 52 is rotated by the actuator 90, the damping coefficients of the extension and compression strokes of the shock absorber 10 change and the damping forces in the extension and compression strokes change, the shock absorber 10 is a shock absorber with variable damping force.

As can be seen from the above explanation, the spool valve body 52 functions as a spool valve driven by the differential pressure between the pressure in the upper cylinder chamber 20 and the pressure in the lower cylinder chamber 22 in cooperation with the main body 14A of the piston 14. The amount of opening of the spool valve, that is, the overlap area between the first and second openings 48 and 66 for the extension stroke and the overlap area between the first and second openings 50 and 68 for the compression stroke, is determined by the differential pressure and is changed by rotation of the spool valve body 52 by the actuator 90.

Next, the relationship between the positions of the first and second openings 48 and 66 for the extension stroke and the first and second openings 50 and 68 for the compression stroke and the damping force characteristics of the shock absorber 10 will be described in various modes.

Figure 12:
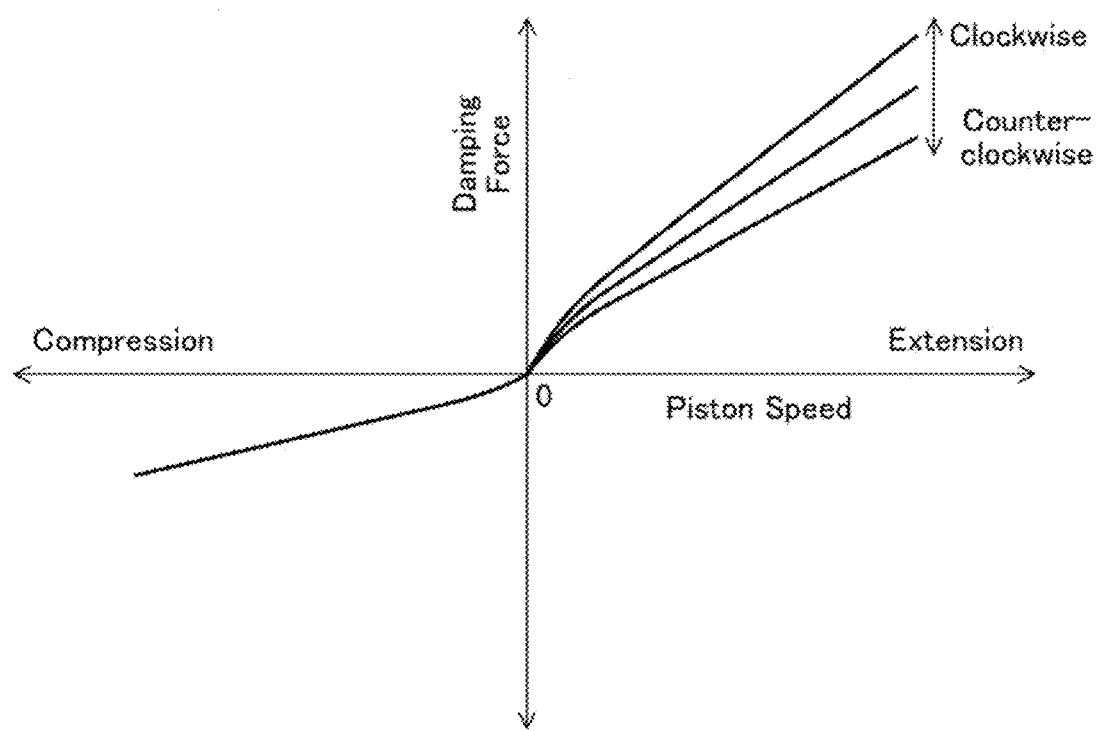
FIG. 12 is a graph showing the damping force characteristics of the first mode.

<The First Mode>
(Extension Stroke=Hard, Compression Stroke=Soft) (FIGS. 11 and 12)

FIG. 11 shows an example of the positions of the openings 48 and 66 for the extension stroke and the openings 50 and 68 for the compression stroke when the spool valve body 52 is in the standard reciprocating and rotating positions for the first mode in which the damping force in the extension stroke is hard and the damping force in the compression stroke is soft.

In FIG. 11 and other similar figures, the solid arrow indicates the direction of movement of the openings 66 with respect to the openings 48 when the spool valve body 52 is lowered (extension stroke), and the dashed arrow indicates the direction of movement of the openings 68 with respect to the openings 50 when the spool valve body 52 is raised (compression stroke). Again, in FIG. 11 and other similar figures, the angle values indicate angles around the relative motion axis 18A with a specific position around the relative motion axis 18A as a reference (angle 0°). Furthermore, the aspect ratios of the openings 48, 50, 66 and 68 illustrated in FIG. 11 and other similar figures are illustrative and are not limited to the aspect ratios illustrated.

When the first openings 66 for the extension stroke is located above the first openings 48 for the extension stroke, and when the spool valve body 52 is in the standard reciprocating and rotating positions, the openings 66 are in contact with the openings 48 at the left ends in a range of 10° and do not overlap with the openings 48. When the spool valve body 52 moves downward with respect to the main body 14A of the piston 14 during the extension stroke, the openings 66 moves downward with respect to the openings 48, and the left ends of the openings 66 overlap with the openings 48. The overlap area between the left ends of the openings 66 and the openings 48 is higher the higher the speed of the piston 14 and the greater the amount of downward movement of the openings 66 with respect to the openings 48.

When the spool valve body 52 is rotated by the actuator 90, the openings 66 move in the left and right directions relative to the openings 48 as seen in FIG. 11, and the overlap area between the openings 66 and 48 changes. In particular, when the spool valve body 52 rotates in a clockwise direction viewed from below, and the openings 66 move to the right relative to the openings 48, the overlap area of the openings 66 and 48 is reduced and the damping force is increased. Conversely, if the openings 66 move to the left relative to the openings 48, the overlap area between the openings 66 and 48 increases and the damping force becomes low.

The second openings 68 for the compression stroke is located below the first openings 50 for the compression stroke, and when the spool valve body 52 is in the standard reciprocating and rotating positions, the openings 68 are in contact with the openings 50 for its entire length and do not overlap with the openings 50. When the spool valve body 52 moves upward relative to the main body 14A of the piston 14 during the compression stroke, the openings 68 moves upward relative to the openings 50, and the openings 68 overlap with the openings 50 over the entire length. The overlap area between the openings 68 and 50 is higher the higher the speed of the piston 14 and the greater the amount of upward movement of the openings 68 with respect to the openings 50.

Also, even if the spool valve body 52 is rotated by the actuator 90 and the openings 68 move to the left or right with respect to the openings 50 as seen in FIG. 11, if the rotation angle is 5° or less, the openings 68 remain overlapped with the openings 50 for the entire length. Therefore, the overlap area between the openings 68 and 50 does not change, so the damping force in the compression stroke does not change even if the spool valve body 52 is rotated within the range of 5°.

Therefore, the damping force characteristics of the first mode are as shown in FIG. 12. The damping forces in the extension and compression strokes increase with the increase in piston speed, but the damping force in the extension stroke is higher than the damping force in the compression stroke. In a small range of piston speed, the rate of increase of damping force in the extension stroke with increasing piston speed is larger than the rate of increase of damping force in the compression stroke. Furthermore, while the damping force in the extension stroke changes when the spool valve body 52 is rotated by the actuator 90, the damping force in the compression stroke does not change even if the spool valve body 52 is rotated by the actuator 90 within the range of 5°.

Figure 14:
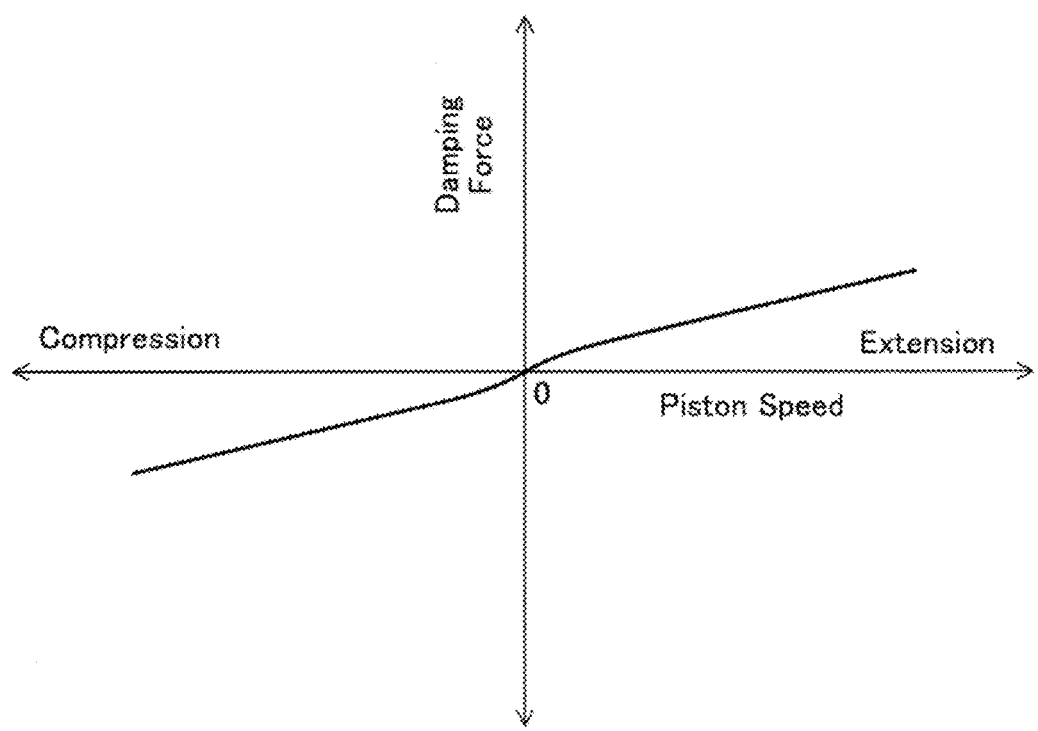
FIG. 14 is a graph showing the damping force characteristics of the second mode.

<The Second Mode>
(Extension Stroke=Soft, Compression Stroke=Soft) (FIGS. 13 and 14)

FIG. 13 shows an example of the positions of the openings 48 and 66 for the extension stroke and the openings 50 and 68 for the compression stroke when the spool valve body 52 is in the standard reciprocating and rotating positions for the second mode in which the damping forces of the extension and compression strokes are soft. Since the contacting situation of the openings 50 and 68 for the compression stroke are the same as that of the first mode described above, the explanation of the positions of the openings is omitted.

The second openings 66 for the extension stroke is located above the first openings 48 for the extension stroke, and when the spool valve body 52 is in the standard reciprocating and rotating positions, the openings 66 are in contact with the openings 48 for its entire length and do not overlap with the openings 48. When the spool valve body 52 moves downward relative to the main body 14A of the piston during the extension stroke, the openings 66 move downward relative to the openings 48, and the openings 66 overlap with the openings 48 along the entire length. The overlap area between the openings 66 and 48 is higher the higher the speed of the piston 14 and the greater the amount of downward movement of the openings 66 relative to the openings 48.

Even if the spool valve body 52 is rotated by the actuator 90 and the openings 66 move to the left or right with respect to the openings 48 as seen in FIG. 13, if the rotation angle is 5° or less, the openings 66 remains overlapped with the openings 48 for the entire length. Therefore, since the overlap area between the openings 66 and 48 does not change, the damping force in the extension stroke does not change even if the spool valve body 52 is rotated within the range of 5°. Also, even if the spool valve body 52 is rotated by the actuator 90 and the openings 66 move to the left or right with respect to the openings 48 as seen in FIG. 13, if the rotation angle is 5° or less, the openings 66 remains overlapped with the openings 48 for the entire length. Therefore, since the overlap area between the openings 66 and 48 does not change, the damping force in the extension stroke does not change even if the spool valve body 52 is rotated within the range of 5°.

Therefore, the damping force characteristics of the second mode are as shown in FIG. 14. The damping force in the extension stroke is opposite to the damping force in the compression stroke of the first mode, but it changes as well as the damping force in the compression stroke of the first mode in response to the change in piston speed. Even if the spool valve body 52 is rotated by the actuator 90 within the range of 5°, the damping force in the compression stroke does not change.

Figure 16:
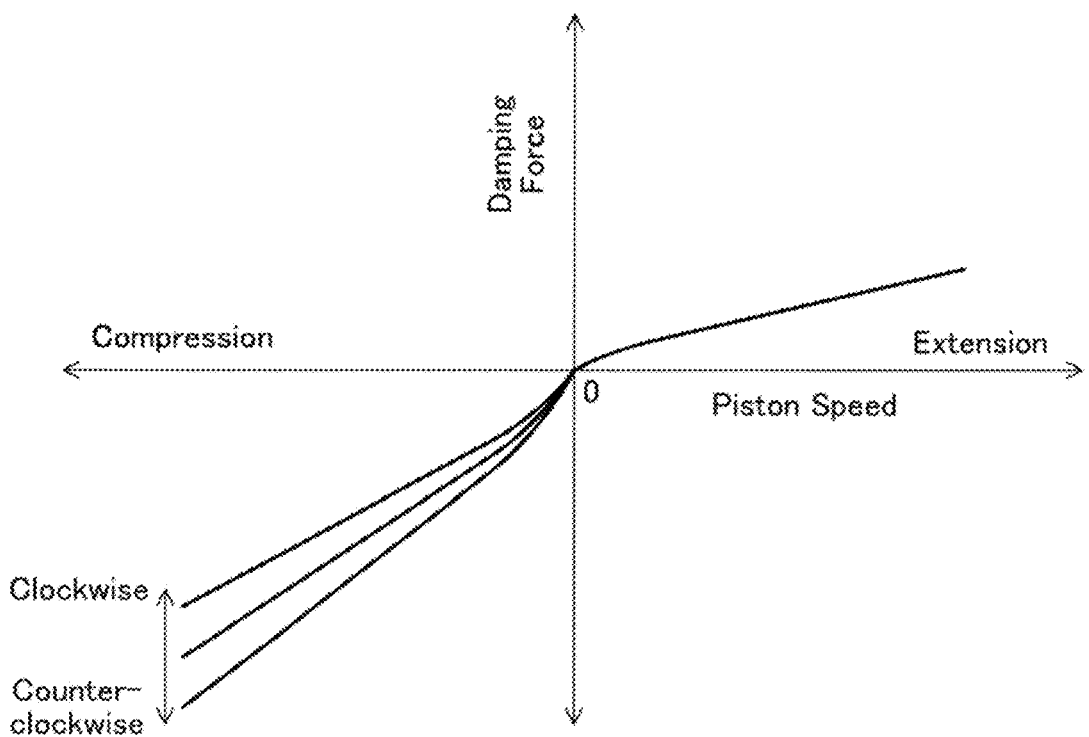
FIG. 16 is a graph showing the damping force characteristics of the third mode.

<The Third Mode>
(Extension Stroke=Soft, Compression Stroke=Hard) (FIGS. 15 and 16)

FIG. 15 shows an example of the positions of openings 48 and 66 for the extension stroke and openings 50 and 68 for the compression stroke when the spool valve body 52 is in the standard reciprocating and rotating positions for the third mode in which the damping force for extension stroke is soft and the damping force for compression stroke is hard.

The second opening 68 for the compression stroke is located below the first opening 50 for the compression stroke, and when the spool valve body 52 is in the standard reciprocating and rotating positions, the openings 68 are in contact with the openings 50 at the right ends in a range of 10° and do not overlap with the openings 50. When the spool valve body 52 moves upward relative to the main body 14A of the piston 14 during the compression stroke, the openings 68 move upward relative to the openings 50, and the right ends of the openings 68 overlap with the openings 50. The overlap area between the right ends of the openings 68 and the openings 50 is higher the higher the speed of the piston 14 and the greater the amount of upward movement of the openings 68 with respect to the openings 50.

When the spool valve body 52 is rotated by the actuator 90, the openings 68 move to the left and right with respect to the openings 50 as seen in FIG. 15, and the overlap area between the openings 68 and 50 changes. In particular, when the spool valve body 52 rotates in a counterclockwise direction viewed from below, and the openings 68 move to the left relative to the openings 50, the overlap area between the openings 68 and 50 is reduced and the damping force is increased. Conversely, if the openings 68 move to the right relative to the openings 50, the overlap area between the openings 68 and 50 increases and the damping force becomes low.

Therefore, the damping force characteristics of the third mode are as shown in FIG. 16. In particular, when the spool valve body 52 rotates in a counterclockwise direction viewed from below, and the opening 68 moves to the left relative to the opening 50, the overlap area between the openings 68 and 50 is reduced and the damping force is increased. Conversely, if the opening 68 moves to the right relative to the opening 50, the overlap area between the openings 68 and 50 increases and the damping force becomes low.

As can be seen from FIGS. 11, 13, and 15, the mutual angular relationship of the openings 48 and 66 for the extension stroke and the openings 50 and 68 for the compression stroke in the first through third modes are the same. In other words, when the spool valve body 52 is rotated counterclockwise by 55° around the relative motion axis 18A from its position in the first mode when viewed from below, the positional relationship of the openings changes from the first mode to the second mode. When the spool valve body is rotated counterclockwise by 50° around the relative motion axis 18A from its position in the second mode, the positional relationship of the openings changes from the second mode to the third mode. Furthermore, when the spool valve body is rotated counterclockwise by 75° around the relative motion axis 18A from its position in the third mode, the positional relationship of the openings changes from the third mode to the first mode.

Conversely, when the spool valve body is rotated clockwise by 75° around the relative motion axis 18A from its position in the first mode, the positional relationship of the openings changes from the first mode to the third mode. Furthermore, as the spool valve body is rotated clockwise by around the relative motion axis 18A from its position in the second mode, the positional relationship of the openings changes from the second mode to the first mode.

Figure 17:
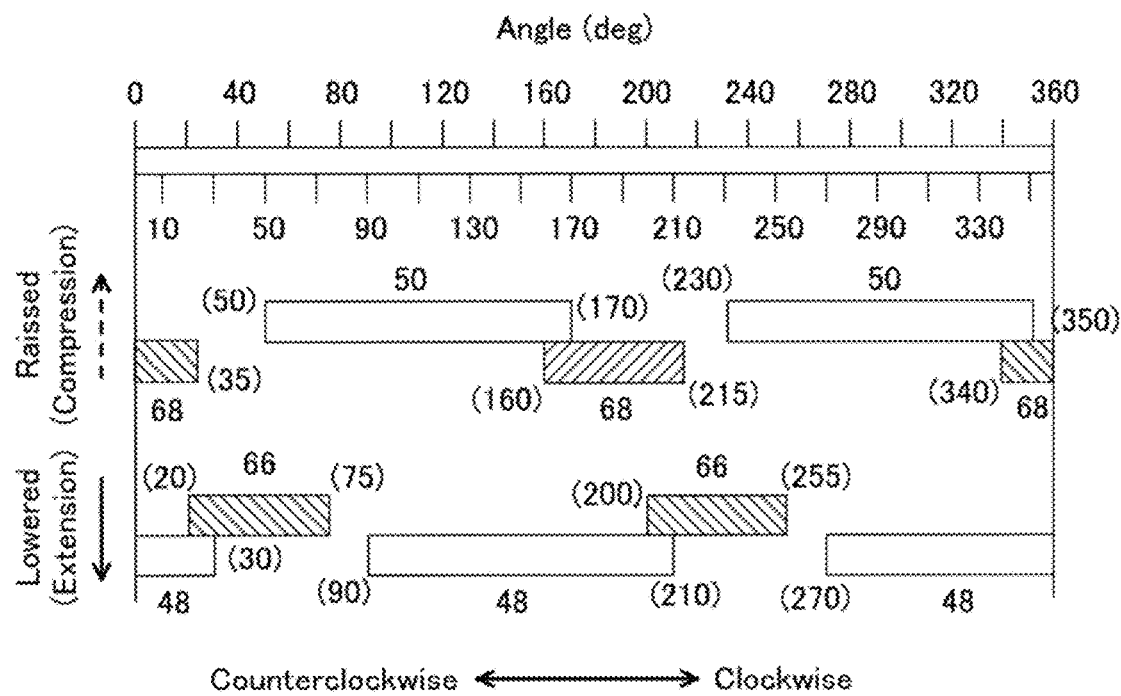
FIG. 17 is a diagram showing the positional relationship between the first and second openings for the extension stroke and the first and second openings for the compression stroke when the spool valve body is in the standard reciprocating and rotating positions for the fourth mode where the damping force characteristics of the extension and compression strokes are hard.
Figure 18:
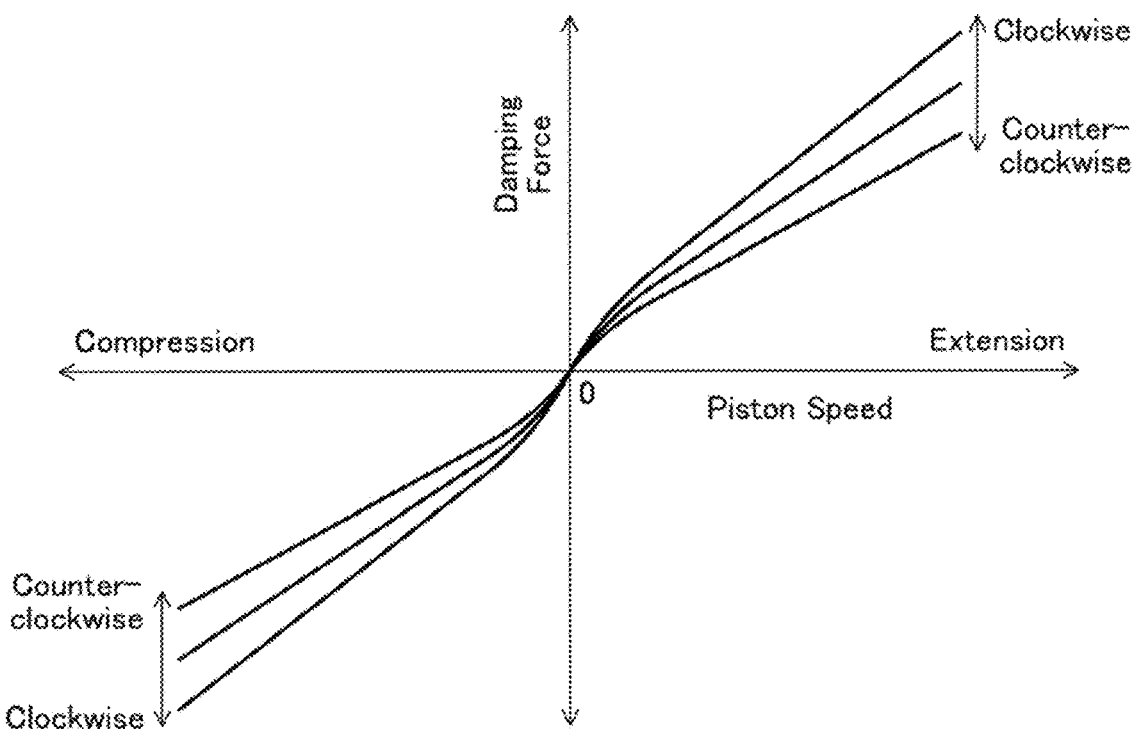
FIG. 18 is a graph showing the damping force characteristics of the fourth mode.

<The Fourth Mode>
(Extension Stroke=Hard, Compression Stroke=Hard)
(FIGS. 17 and 18)

FIG. 17 shows an example of the positions of the openings 48 and 66 for the extension stroke and the openings 50 and 68 for the compression stroke when the spool valve body 52 is in the standard reciprocating and rotating positions for the fourth mode in which the damping forces in the extension and compression strokes are hard.

In the fourth mode, the positional relationship of the first openings 48 for the extension stroke and the second openings 66 for the extension stroke are identical to that in the first mode described above. Therefore, when the spool valve body 52 moves downward relative to the main body 14A of the piston 14 during the extension stroke, the openings 66 move downward relative to the openings 48, and the right ends of the openings 66 overlap with the openings 48. The overlap area between the right ends of the openings 66 and the openings 48 is higher the higher the speed of the piston 14 and the greater the amount of downward movement of the openings 66 with respect to the openings 48.

When the spool valve body 52 is rotated by the actuator 90, the openings 66 move to the right and left as seen in FIG. 17 with respect to the openings 48, and the overlap area between the openings 66 and 48 changes as in the first mode.

The second opening 68 for the compression stroke is located below the openings 50 for the first compression stroke, and when the spool valve body 52 is in the standard reciprocating and rotating positions, the openings 68 is in contact with the openings 50 at the left ends in a range of 10° and does not overlap with the openings 50. When the spool valve body 52 moves upward relative to the main body 14A of the piston 14 during the compression stroke, the openings 68 moves upward relative to the openings 50, and the left ends of the openings 68 overlap with the openings 50. The overlap area between the left ends of the openings 68 and the openings 50 is higher the higher the speed of the piston 14 and the greater the amount of upward movement of the openings 68 with respect to the openings 50.

As the spool valve body 52 is rotated by the actuator 90, the overlap area between the openings 68 and 50 changes as the openings 68 move in the left and right directions relative to the openings 50 as seen in FIG. 17. In particular, when the spool valve body 52 rotates in a clockwise direction viewed from below and the openings 68 move to the right relative to the openings 50, the overlap area between the openings 68 and 50 is reduced and the damping force in the compression stroke is increased. Conversely, if the spool valve body 52 rotates counterclockwise viewed from below and the openings 88 move to the left relative to the openings 50, the overlap area between the openings 88 and 50 increases, and the damping force in the compression stroke decreases. It should be noted that the change in the damping force in the extension stroke accompanying the rotation of the spool valve body 52 is the same as in the first mode described above.

Therefore, the damping force characteristics of the fourth mode are as shown in FIG. 18. The damping forces in the extension and compression strokes increases with the increase of the piston speed as the damping force in the extension stroke in the first mode and the damping force in the compression stroke in the third mode. The damping forces in the extension and compression strokes change as the spool valve body 52 is rotated by the actuator 90. Notably, the relationship between the direction of rotation of the spool valve body 52 and the increase or decrease of the damping force in the compression stroke is the opposite of the relationship in the third mode.

Next, with reference to FIGS. 19 through 24, the fifth through seventh modes, which are variants of the first mode, will be described. In addition, the damping force characteristics of the extension stroke is hard and the damping force characteristics of the compression stroke is soft, and the positional relationship of the openings 48 and 66 for the extension stroke and the openings 50 and 68 for the compression stroke are the same as those in the first mode shown in FIG. 11, so the illustration of the positional relationship of the openings is omitted.

Figure 19:
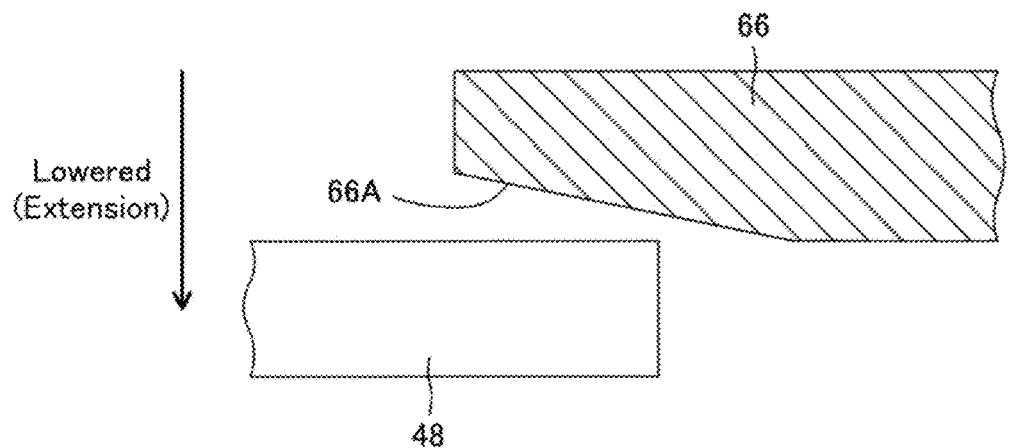
FIG. 19 is an enlarged partial view showing the right end of the first opening for the extension stroke and the left end of the second opening for the extension stroke in the fifth mode which is the first variant of the first mode.
Figure 20:
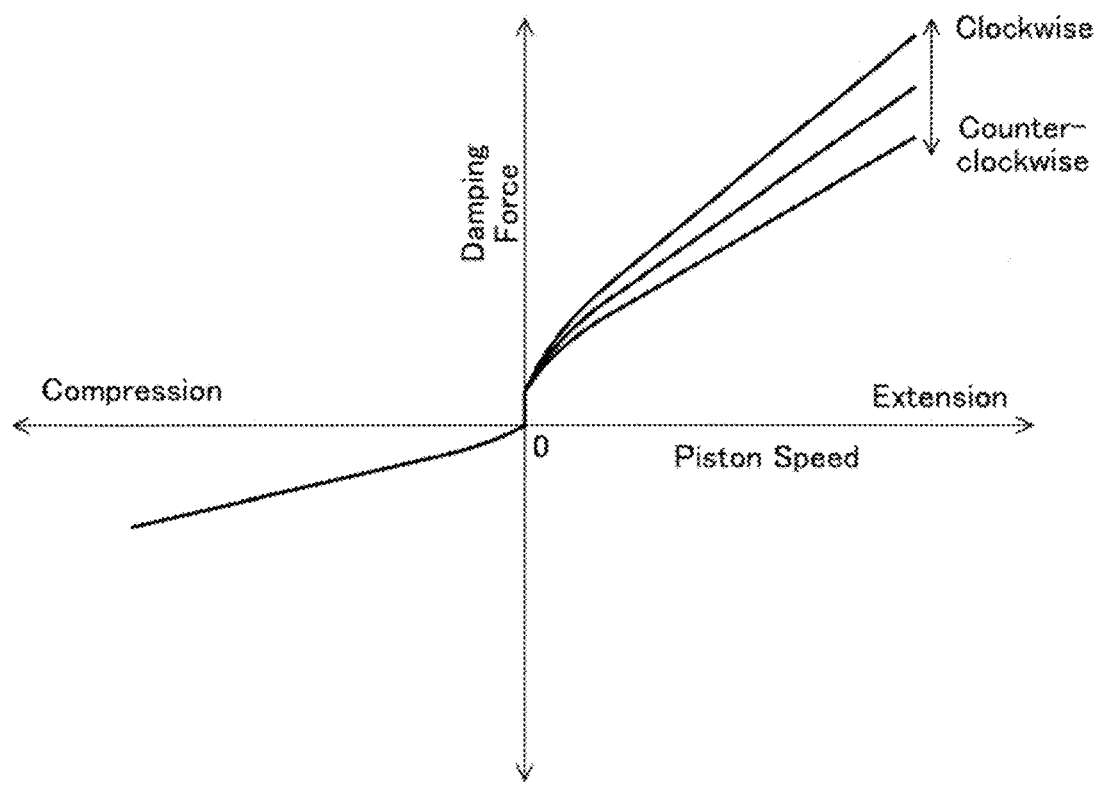
FIG. 20 is a graph showing the damping force characteristics of the fifth mode.

<The Fifth Mode>
(Extension Stroke=Hard (First Variant), Compression Stroke=Soft) (FIGS. 19 and 20)

FIG. 19 is an enlarged partial view showing the right end portion of the first opening 48 for the extension stroke and the left end portion of the second opening 66 for the extension stroke in the fifth mode, which is a first variant of the first mode. The width in the vertical direction of the opening 66 is larger than the width in the vertical direction of the opening 48, and the left end portion of the opening 66 has an inclined portion 66A in which the lower edge of the opening 66 is inclined gradually away from the opening 48 as it moves toward the left end. The inclined portion 66A is positioned above the opening 48 when the spool valve body 52 is in the standard reciprocating and rotating positions.

In the fifth mode, even if the spool valve body 52 moves downwardly with respect to the main body 14A of the piston 14 during the extension stroke and the opening 66 moves downwardly with respect to the opening 48, the left end portion of the opening 66 does not overlap with the opening 48 if the amount of movement is small. As the amount of movement of the opening 66 increases, the left end portion of the opening 66 overlaps with the opening 48. The overlap area between the left end portion of the opening 66 and the opening 48 is higher the higher the speed of the piston 14 and the greater the amount of downward movement of the opening 66 with respect to the opening 48, but the rate of increase in the overlap area is smaller than the rate of increase in the first mode.

Therefore, the damping force characteristics of the fifth mode are as shown in FIG. 20. Although the damping force in the extension stroke increases with increasing piston speed, the damping force at the beginning of the extension stroke is higher than 0. In the small range of piston speed, the rate of increase of damping force in the extension stroke with increasing piston speed is larger than the rate of increase in the first mode. Again, in the fifth mode, the damping force in the extension stroke changes as the spool valve body 52 is rotated by the actuator 90. The damping force characteristic of the compression stroke is the same as that in the first mode.

Figure 21:
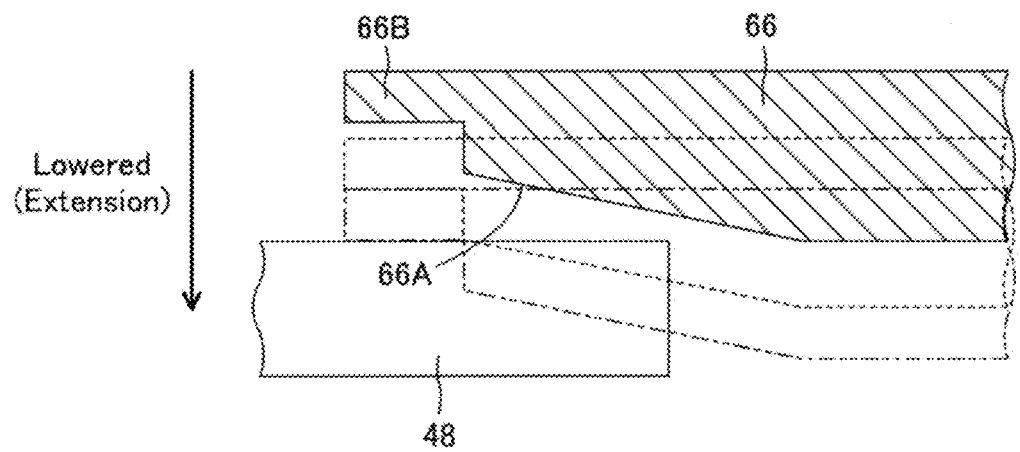
FIG. 21 is an enlarged partial view showing the right end of the first opening for the extension stroke and the left end of the second opening for the extension stroke in the sixth mode which is the second variant of the first mode.
Figure 22:
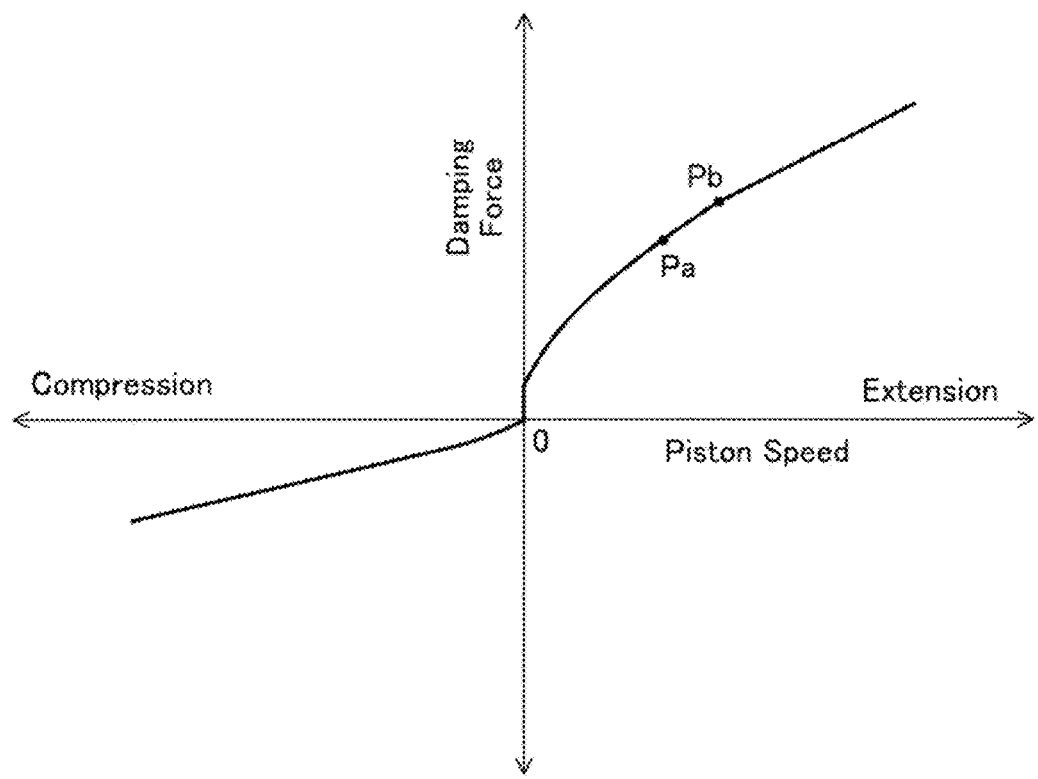
FIG. 22 is a graph showing the damping force characteristics of the sixth mode.

<The Sixth Mode>
(Extension Stroke=Hard (Second Variant), Compression Stroke=Soft) (FIGS. 21 and 22)

FIG. 21 is an enlarged partial view showing the right end portion of the first opening 48 for the extension stroke and the left end portion of the second opening 66 for the extension stroke in the sixth mode, which is a second variant of the first mode. Again, in the sixth mode, the vertical width of the opening 66 is greater than the vertical width of the opening 48. The left end portion of the opening 66 has an inclined portion 66A whose lower edge is inclined gradually from the opening 48 as it moves toward the left end, and a band-like portion 66B located at the tip of the inclined portion and whose width in the vertical direction is smaller than the inclined portion. The inclined portion 66A and the band-shaped portion 66B are positioned above the opening 48 when the spool valve body 52 is in the standard reciprocating and rotating positions.

In the sixth mode, even if the spool valve body 52 moves downwardly with respect to the main body 14A of the piston 14 during the extension stroke and the opening 66 moves downwardly with respect to the opening 48, the left end portion of the opening 66 does not overlap with the opening 48 if the amount of movement is small. When the movement of the opening 66 becomes large, the inclined portion 66A of the opening 66 overlaps with the opening 48, and when the movement of the opening 66 becomes even larger, the amount of overlap between the inclined portion 66A of the opening 66 and the opening 48 increases. When the amount of movement of the opening 66 is further increased, the band-shaped portion 66B also overlaps with the opening 48.

Although the overlap area between the left end portion of the opening 66 and the opening 48 is higher the higher the speed of the piston 14 and the greater the amount of downward movement of the opening 66 with respect to the opening 48, the rate of increase in the overlap area when the inclined portion 66A of the opening 66 overlaps with the opening 48 is smaller than the rate of increase in the first mode. Note that when the opening 66 moves downward from the position indicated by the dashed line in FIG. 21, the rate of increase in the overlap area increases, and when the opening 66 moves downward from the position indicated by the two-dotted chain line in FIG. 21, it becomes identical to the rate of increase in the first mode.

Therefore, the damping force characteristics of the sixth mode are as shown in FIG. 22. Although the damping force of the extension stroke increases with increasing piston speed, the damping force at the beginning of the extension stroke is higher than 0. In the small range of piston speed, the rate of increase of damping force in the extension stroke with increasing piston speed is larger than the rate of increase in the first mode. In FIG. 22, the points Pa and Pb indicate the damping force when the opening 66 is in the positions indicated by the dashed and two-dotted chain lines in FIG. 21, respectively. The damping force characteristic of the compression stroke is the same as that in the first mode. Although not shown in FIG. 22, in the sixth mode, the damping force in the extension stroke changes as the spool valve body 52 is rotated by the actuator 90.

Figure 23:
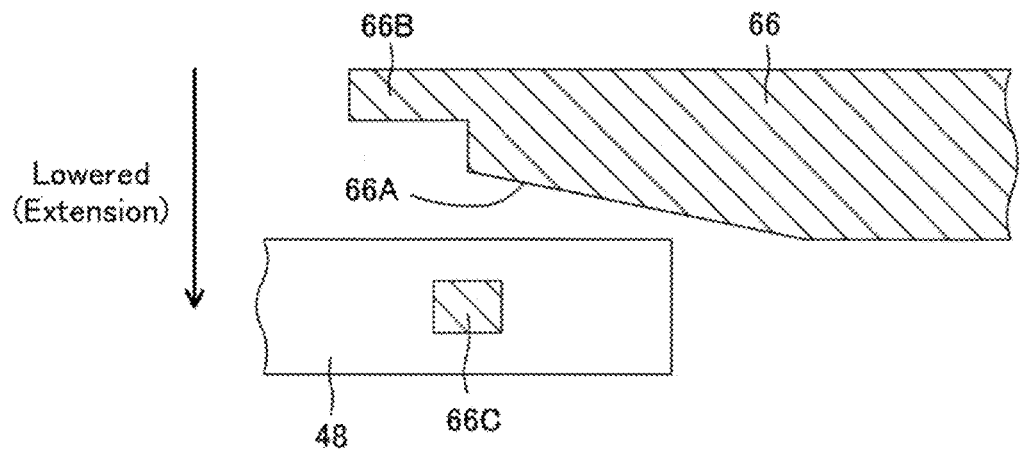
FIG. 23 is an enlarged partial view showing the right end of the first opening for the extension stroke and the left end of the second opening for the extension stroke in the seventh mode which is the third variant of the first mode.
Figure 24:
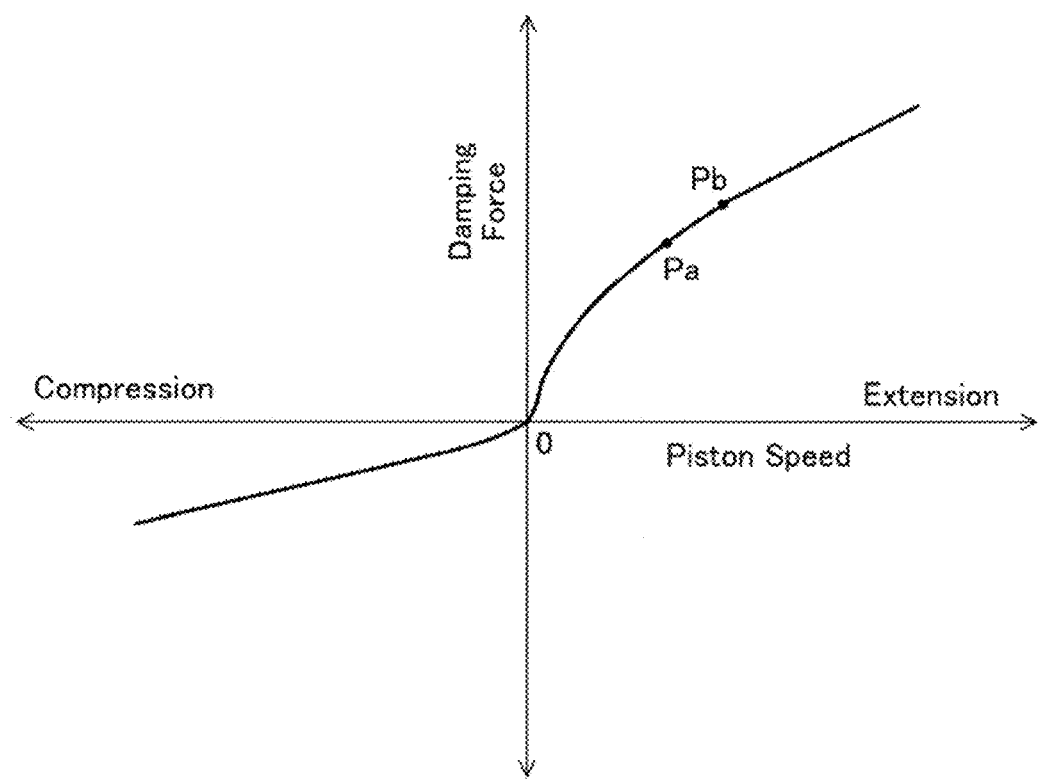
FIG. 24 is a graph showing the damping force characteristics of the seventh mode.

<The Seventh Mode>
(Extension Stroke=Hard (Third Variant), Compression Stroke=Soft) (FIGS. 23 and 24)

FIG. 23 is an enlarged partial view showing the right end portion of the first opening 48 for the extension stroke and a left end portion of the second opening 66 for the extension stroke in the seventh mode, which is a third variant of the first mode. In the seventh mode, the vertical width of the opening 66 is greater than the vertical width of the opening 48, and the left end portion of the opening 66 is configured similarly to the left end portion of the opening 66 in the sixth mode. The second opening 66 for the extension stroke further has a fixed orifice 66C. The inclined portion 66A and the band-shaped portion 66B are positioned above the opening 48 when the spool valve body 52 is in the standard reciprocating and rotating position, but the fixed orifice 66C always overlaps with the first opening 48 for the extension stroke regardless of the position of the spool valve body 52.

In the seventh mode, since the fixed orifice 66C always overlaps with the opening 48, in the region where the piston speed is extremely small, the damping force increases as the piston speed increases and the rate of increase of the damping force gradually increases. Therefore, when the piston speed is extremely small, the curve of the damping force characteristic in the extension stroke becomes downwardly convex. When the piston speed is further increased, the left end portion of the opening 66 overlaps with the opening 48, so that in the region where the piston speed is greater than the region where the piston speed is extremely small, the curve of the damping force characteristic is similar to the curve of the damping force characteristic of the sixth mode. The damping force characteristic of the compression stroke is the same as that i the first mode.

Notably, the structure of the opening 66 of any of the fifth through seventh modes may be applied to the right end portion of the second opening 68 for the compression stroke of the third mode, and may be applied to the right end portion of the opening 66 for the first compression stroke of the fourth mode and/or to the left end of the opening 68 for the second compression stroke. Furthermore, in the sixth and seventh modes, the vertical directional width of the band-shaped portion 66B may be the same as the vertical directional width of the tip of the inclined portion 66A. In other words, there may be no difference in width in the vertical direction between the inclined portion 66A and the band-shaped portion 668.

<Differences from Damping Force Characteristics of Conventional Shock Absorbers>

In conventional shock absorbers, the damping force generator installed in the piston has orifices, and an upper cylinder chamber and a lower cylinder chamber are connected to each other by the orifices even when the piston speed is 0. When a piston speed is low and a damping force generating valve is closed, oil passes through the orifices and flows between the upper cylinder chamber and the lower cylinder chamber, and damping force is generated by the resistance of the oil flowing through the orifices.

Let a flow rate of oil through the orifices be Q, a flow coefficient be c, and a cross-sectional area of the orifices be A. Let a differential pressure between the upper cylinder chamber and the lower cylinder chamber be ΔP, and a density of oil be ρ. As it is well known, the flow rate Q of the oil is expressed by the following equation (1), and the differential pressure ΔP is expressed by the following equation (2).

$$Q = cA\sqrt{\frac{2\Delta P}{\rho}} \tag{1}$$

$$\Delta P = \frac{\rho}{2c^2A^2}Q^2 \tag{2}$$

As can be seen from equation (2), the differential pressure ΔP is a quadratic function of the oil flow rate Q and changes when the cross-sectional area A of the orifices is changed. Damping force is proportional to the differential pressure ΔP and the piston speed is proportional to the oil flow rate Q. Therefore, since damping force is a quadratic function of piston speed, the rate of increase of damping force with increasing piston speed gradually increases with increasing piston speed in a small range of piston speed. In addition, the damping force changes when the cross-sectional area A of the orifices is changed.

Figure 25:
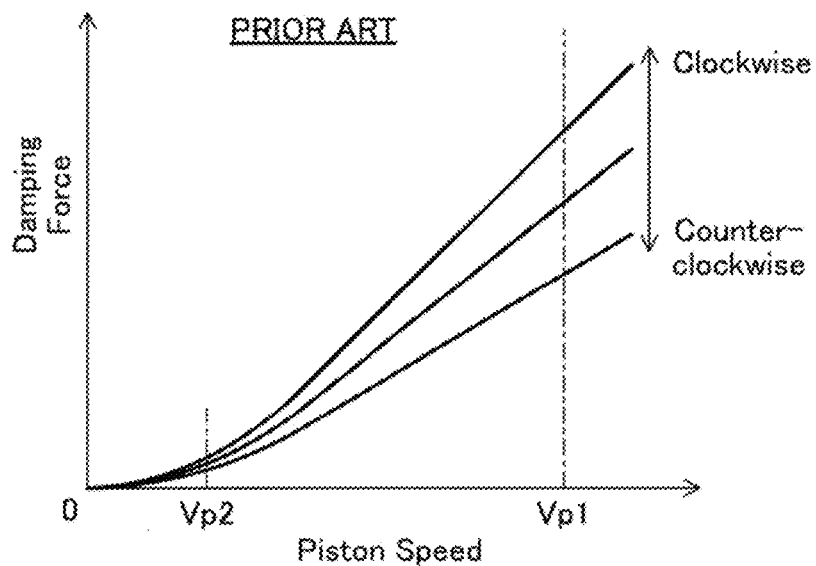
FIG. 25 is a graph showing a damping force characteristics of a conventional shock absorber in the low piston speed region.

Therefore, the damping force characteristics of a conventional shock absorber in a low piston speed region are those shown in FIG. 25. As shown in FIG. 25, when a piston speed is a large value such as Vp1 in a low range, the damping force can be changed relatively significantly by changing the cross-sectional area A of orifices by the actuator. However, when the piston speed is a small value such as Vp2 in a low range, the damping force cannot be effectively changed even if the cross-sectional area A of the orifices is changed by the actuator. This is also true for the shock absorber described in the aforementioned Japanese Patent Application Laid-open Publication No. H07-233840, where damping forces are generated by a flow resistance of oil as it passes through orifices in the region of low piston speed.

In contrast, in the shock absorber 10 of the present disclosure, as can be seen from the graphs of the damping force characteristics shown in FIG. 12, etc., the rate of increase of the damping force with the increase of the piston speed gradually decreases with the increase of the piston speed in a minute range of the piston speed, except for the seventh mode.

Let a circumferential length of the regions overlapping each other of the two openings be b and an axial length be x. Let a spring constant of the compression coil springs 54 and 56 that press down on the spool valve body 52 be k, and let the pressure-receiving area of the spool valve body 52 be S. An area of the overlap region between the two openings which functions as an orifice, that is, a cross-sectional area A of the orifice, is expressed by the following equation (3), and the following equation (4) is obtained from the balance of the vertical forces acting on the spool valve body 52.

$$A = bx \tag{3}$$

$$kx = S\Delta P \tag{4}$$

By substituting x in equation (4) into equation (3), the following equation (5) is obtained, and a flow rate Q of oil is expressed by the following equation (6). From equation (6), a differential pressure ΔP is expressed by the following equation (7).

$$A = \frac{bS\Delta P}{k} \tag{5}$$

$$Q = c\frac{bS\Delta P}{k}\sqrt{\frac{2\Delta P}{\rho}} \tag{6}$$

$$\Delta P = \left(\frac{\rho k^2}{2c^2b^2S^2}\right)Q^{\frac{2}{3}} \tag{7}$$

Since the damping force is proportional to the differential pressure ΔP and the piston speed is proportional to the flow rate Q of oil, the damping force is proportional to the piston speed to the power of ⅔. Therefore, the increase rate of damping force with increasing piston speed gradually decreases with increasing piston speed in the small range of piston speed. The damping force also changes as the spool valve body 52 is rotated by the actuator 90 and the circumferential length b of the mutually overlapping regions of the two openings is changed.

Figure 26:
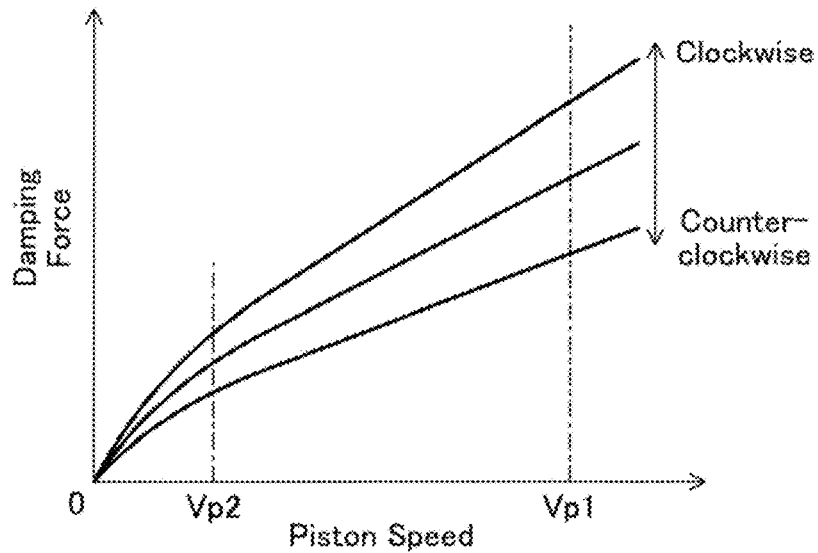
FIG. 26 is a graph showing the damping force characteristics of the shock absorber of the present disclosure in the region of low piston speed.

Therefore, the damping force characteristics of the shock absorber of the present disclosure in the region of low piston speed are the characteristics shown in FIG. 26. As can be seen from FIG. 26, even when the piston speed is a small value such as Vp2 in a low range, the damping force can be changed relatively significantly by rotating the spool valve body 52 by the actuator 90 to change the length b.

<Effects of Embodiment>

As can be seen from the above explanation, according to the embodiment, even if the spool valve body 52 moves from a position other than the standard reciprocating position to the standard reciprocating position, the spool valve body is not seated on any valve seat member. Therefore, damping force can be generated in the shock absorber without generating noise from a valve member or the like seating on the seat member.

According to the embodiment, one spool valve body is sufficient, and the damping forces in the extension and compression strokes are generated by the displacement of one spool valve body 52 relative to the cylindrical portion 14A with the displacement of the piston 14 relative to the cylinder 12. In addition, by rotating one spool valve body 52 around the relative motion axis 18A, the damping force can be changed in both the extension and compression strokes. Therefore, since there is no need to provide respective spool valves for extension and compression strokes, a variable damping force shock absorber can be manufactured with a simpler structure than the case of improving the structure of the shock absorber described in the aforementioned Japanese translation of PCT international application No. 2013-507589.

In addition, according to the embodiment, as can be seen from FIGS. 12, 14, 16, 18 and 26, the damping force in the extremely small range of piston speed is higher than that of the conventional shock absorber, and the rate of increase of damping force in the extremely small range of piston speed with increase of piston speed progressively decreases with increase of piston speed. Therefore, it is possible to effectively prevent insufficient damping force in the extremely small range of piston speed as compared to where the damping force in the extremely small range of piston speed is low and the rate of increase of damping force with the increase of piston speed gradually increases with the increase of piston speed as shown in FIG. 25 with respect to the conventional shock absorber.

Furthermore, according to the embodiment, as can be seen from the comparison between FIG. 25 and FIG. 26, the change in damping force in the extremely small range of the piston speed can be increased as compared with the conventional shock absorber, so that the variable effect of damping force in the extremely small range of the piston speed can be increased.

Moreover, according to the embodiment, the mode of the shock absorber can be changed to the first through third modes simply by rotating the spool valve body 52 by the actuator 90. In the first mode, the damping force in the extension stroke is hard and the damping force in the compression stroke is soft. In the second mode, the damping forces in the extension and compression strokes are soft. In addition, in the third mode, the damping force in the extension stroke is soft and the damping force in the compression stroke is hard. Therefore, the first through third modes required in the control of the damping force, for example, the control of the damping force based on the sky hook theory, can be easily achieved. Moreover, since there is no need to provide first and second openings for the extension stroke and first and second openings for the compression stroke for each mode, the structure of the damping force generator can be simplified as compared to where openings are provided for each mode.

Furthermore, according to the embodiment, the coupling device 96 coupling the axial portion 52D of the spool valve body 52 with the output shaft 92 of the actuator 90 is configured to allow the spool valve body 52 to be displaced with respect to the actuator 90 along the relative motion axis 18A, but to prevent the spool valve body 52 from rotating with respect to the actuator around the relative motion axis.

Therefore, since it is not necessary to move the actuator 90 along the relative motion axis 18A in synchronization with the spool valve body 52 when the spool valve body displaces along the relative motion axis, a support structure of the actuator can be simplified and a means to drive the actuator can be eliminated.

Furthermore, according to the embodiment, thrust bearings 82 and 86 are disposed between the spool valve body 52 and the compression coil springs 54 and 56 as a pair of elastic elements, respectively. Therefore, the spool valve body is able to rotate around the relative motion axis 18A with virtually no resistance in the direction of rotation by the compression coil spring. Therefore, the spool valve body can be smoothly rotated around the relative motion axis 18A by the actuator 90 as compared to where no thrust bearing intervenes between the spool valve body and the compression coil springs.

In particular, according to the embodiment, the first opening 48 for the extension stroke, the first opening 50 for the compression stroke, the second opening 66 for the extension stroke, and the second opening 68 for the compression stroke are each provided in an arrangement in which they are spaced apart in the radial direction with respect to the relative motion axis 18A. Thus, the rotation angle of the spool valve body 52 required to change the modes to the first through third modes can be reduced as compared to where only one each opening is provided. Therefore, a time required for mode change can be shortened and a responsiveness of mode change can be increased, and an energy consumption by the actuator 90 can be reduced.

It is to be noted that the main body 14A and the spool valve body 52 may be modified so that the number of openings is one each, and conversely, the number of openings may be modified so that the number of openings is three or more each.

In addition, any of the first through third modes may be omitted and the modes of the shock absorber may be changed into two modes.

Although the present disclosure has been described in detail with reference to a specific embodiment, it will be apparent to those skilled in the art that the present disclosure is not limited to the above-described embodiment, and various other embodiments are possible within the scope of the present disclosure.

For example, in the above-mentioned embodiment, with the exception of the fifth through seventh modes, the first openings 48 for the extension stroke, the first openings 50 for the compression stroke, the second openings 66 for the extension stroke, and the second openings 68 for the compression stroke are each extended in the above-mentioned angular range in a band. However, the shape, length, and extending range of each of these openings may be altered other than the shape, length, and extending range described above.

In the above-mentioned embodiment, the circumferential length of the first openings 48 for the extension stroke and the first openings 50 for the compression stroke is greater than the circumferential length of the second openings 66 for the extension stroke and the second openings 68 for the compression stroke, respectively. However, the relationship between the circumferential lengths of these openings may be the opposite of the relationship in the embodiment.

In the above-mentioned embodiment, when the spool valve body 52 is in the standard reciprocating position, the first openings 48 for the extension stroke and the second openings 66 for the extension stroke do not overlap each other, but the openings 48 and 66 may overlap each other.

Similarly, when the spool valve body 52 is in the standard reciprocating position, the first openings 50 for the compression stroke and the second openings 68 for the compression stroke do not overlap each other, but the openings 50 and 68 may also overlap each other.

Furthermore, in the above-mentioned embodiment, the coupling device 96 comprises a flat plate type connecting portion 88 provided at the upper end of the axial portion 52D of the spool valve body 52 and a yoke type connecting portion 94 provided at the output shaft 92 of the actuator 90 that engages with the connecting portion 88 in two planes. However, as long as the spool valve body 52 is capable of being displaced with respect to the actuator 90 along the relative motion axis 18A, but the spool valve body is prevented from rotating with respect to the actuator around the relative motion axis 18A, the coupling device 96 may have any structure known in the art. For example, it may be a serration or a D-shaped cross-section with a single plane section.

Furthermore, in the above-mentioned embodiment, the shock absorber 10 is a variable damping force shock absorber in which the overlap area between the two openings is changed as the spool valve body 52 is rotated around the relative motion axis 18A by the actuator 90. However, the structure of the shock absorber of the present disclosure may be applied to a non-damping force variable shock absorber in which the spool valve body 52 is not rotated around the relative motion axis 18A.

Furthermore, in the above-mentioned embodiment, the shock absorber 10 is configured as a twin-tube shock absorber, but the shock absorber of the present disclosure may be configured as a mono-tube shock absorber.

What is claimed is:

1. A shock absorber comprising a cylinder, a piston that is reciprocally engaged with the cylinder along a main axis to form first and second cylinder chambers in cooperation with the cylinder, and a damping force generator supported by the piston within the cylinder, the first and second cylinder chambers containing a working fluid, wherein
 the damping force generator includes a spool valve body that is reciprocally engaged with a cylindrical portion provided in the piston along a relative motion axis, and a pair of elastic elements that press the spool valve body in a direction approaching each other from both sides along the relative motion axis;
 the cylindrical portion has an outer diameter larger than the other portions of the piston and has a sliding portion that is in contact with the cylinder, and a first opening for a extension stroke and a first opening for a compression stroke provided on the side of the second and first cylinder chambers, respectively, with respect to the sliding portion;
 the spool valve body has a second opening for the extension stroke and a second opening for the compression stroke, and the spool valve body cooperates with the cylindrical portion to form a first inner chamber that is always in communication with the second cylinder chamber and a second inner chamber that is always in communication with the first cylinder chamber;
 the damping force generator is configured so that in the extension stroke, the first and second cylinder chambers are connected through the first and second openings for the extension stroke that at least partially overlap each other and the first inner chamber, and a damping force in the extension stroke is generated by a flow resistance when the working fluid passes through the first and second openings for the extension stroke, and in the compression stroke, the first and second cylinder chambers are connected through the first and second openings for the compression stroke that at least partially overlap each other and the second inner chamber, and a damping force in the compression stroke is generated by a flow resistance when the working fluid passes through the first and second openings for the compression stroke; and
 the damping force generator is configured to change an overlap area of the first and second openings for the extension stroke and an overlap area of the first and second openings for the compression stroke by displacing the spool valve body relative to the cylindrical portion along the relative motion axis by a difference between pressures in the first and second cylinder chambers when the piston is displaced relative to the cylinder along the main axis.

2. The shock absorber according to claim 1, wherein an overlap area of the first and second openings for the extension stroke and an overlap area of the first and second openings for the compression stroke are minimized when a pressing forces of the pair of elastic elements acting on the spool valve body are the same and the spool valve body is in a standard reciprocating position with respect to the cylindrical portion.

3. The shock absorber according to claim 1, wherein the shock absorber further includes an actuator that rotates the spool valve body about the relative motion axis, and the damping force generator is configured to change the overlap area of the first and second openings for the extension stroke and the overlap area of the first and second openings for the compression stroke by rotating the spool valve body relative to the cylindrical portion.

4. The shock absorber according to claim 3, wherein the actuator is coupled to the spool valve body by a coupling device, and the coupling device is configured to allow the spool valve body to be displaced with respect to the actuator along the relative motion axis, but to prevent the spool valve body from rotating relative to the actuator around the relative motion axis.

5. The shock absorber according to claim 3, wherein thrust bearings are disposed between the spool valve body and the pair of elastic elements.

6. The shock absorber according to claim 3, wherein the spool valve body is rotated relative to the cylindrical portion by the actuator, and the positional relationship around the relative motion axis of the first and second openings for the extension stroke and the positional relationship around the relative motion axis of the first and second openings for the compression stroke are changed, so that modes of the damping force can be changed to at least two modes including a first mode in which the damping force in the extension stroke is hard and the damping force in the compression stroke is soft, a second mode in which the damping force in the extension stroke and the damping force in the compression stroke are soft, and a third mode in which the damping force in the extension stroke is soft and the damping force in the compression stroke is hard.

7. The shock absorber according to claim 3, wherein the cylindrical portions has a pair of first openings for the extension stroke and a pair of first openings for the compression stroke, the openings of each pair being spaced apart in a radial direction with respect to the relative motion axis, and the spool valve body has a pair of second openings for the extension stroke and a pair of second openings for the compression stroke, the openings of each pair being spaced apart in a radial direction with respect to the relative motion axis.

\* \* \* \* \*